United States Patent
Kobayashi et al.

(10) Patent No.: US 9,787,205 B2
(45) Date of Patent: Oct. 10, 2017

(54) POWER SOURCE DEVICE AND IMAGE FORMING APPARATUS

(71) Applicant: CANON KABUSHIKI KAISHA, Tokyo (JP)

(72) Inventors: Junya Kobayashi, Suntou-gun (JP); Nobuyuki Uchiyama, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/377,165

(22) Filed: Dec. 13, 2016

(65) Prior Publication Data
US 2017/0176916 A1    Jun. 22, 2017

(30) Foreign Application Priority Data
Dec. 16, 2015  (JP) ................. 2015-245100

(51) Int. Cl.
*H02M 3/335* (2006.01)
*G03G 15/00* (2006.01)
*H02M 7/48* (2007.01)

(52) U.S. Cl.
CPC ... *H02M 3/33569* (2013.01); *H02M 3/33546* (2013.01); *G03G 15/80* (2013.01); *H02M 3/3353* (2013.01); *H02M 2007/4815* (2013.01); *H02M 2007/4818* (2013.01)

(58) Field of Classification Search
CPC ..... H02M 3/33569; H02M 2007/4815; H02M 2007/4818; H02M 3/3353; H02M 3/33546; G03G 15/80
USPC ................................. 363/17, 21.02
See application file for complete search history.

(56) References Cited

U.S. PATENT DOCUMENTS

| | | | |
|---|---|---|---|
| 5,414,609 A * | 5/1995 | Levran | H01F 27/2866 363/132 |
| 8,704,599 B2 * | 4/2014 | Umemura | H02M 3/3387 330/10 |
| 8,880,911 B2 | 11/2014 | Karino et al. | |
| 9,106,148 B2 | 8/2015 | Uchiyama | |
| 9,304,478 B2 | 4/2016 | Hayasaki et al. | |
| 2011/0103100 A1 * | 5/2011 | Hosotani | H01F 3/10 363/21.02 |

(Continued)

FOREIGN PATENT DOCUMENTS

JP    2013-143877 A    7/2013

*Primary Examiner* — Kyle J Moody
(74) *Attorney, Agent, or Firm* — Fitzpatrick, Cella, Harper & Scinto

(57) ABSTRACT

A power source device includes a transformer, a first switching element and a second switching element, a resonance capacitor, and a switch. One end of the second switching element is connected with one end portion of a primary winding. The other end of the second switching element is connected with one end portion of the resonance capacitor. The primary winding and the resonance capacitor are resonated with each other by alternately operating the first and second switching elements to supply electric power to a load connected with a secondary winding of the transformer. The primary winding includes a first primary winding and a second primary winding. Depending on the load, the switch connects or disconnects between the first primary winding and the resonance capacitor, or connects or disconnects between the second primary winding and said resonance capacitor.

21 Claims, 14 Drawing Sheets

(56) References Cited

U.S. PATENT DOCUMENTS

| | | | |
|---|---|---|---|
| 2012/0106207 A1* | 5/2012 | Tsai | H01F 27/324 363/21.02 |
| 2014/0063863 A1* | 3/2014 | Cuadra | H01F 27/324 363/21.02 |
| 2015/0171754 A1* | 6/2015 | Scibilia | H02M 3/33507 363/21.02 |
| 2015/0355593 A1* | 12/2015 | Uchiyama | G03G 15/80 399/88 |

* cited by examiner (a)

(b)

(a)

(b)

(a)

(b)

POWER SOURCE DEVICE AND IMAGE FORMING APPARATUS

FIELD OF THE INVENTION AND RELATED ART

The present invention relates to a power source device of a current resonance type and an image forming apparatus including the power source device.

As a switching power source which is high in electric power conversion efficiency and low in noise, the power source device using the current resonance type has been used in general. In the power source device of the current resonance type, leakage inductance of a transformer is used as a circuit element, and electric power is supplied from a primary side to a secondary side. In the primary side of the transformer of the power source device of the current resonance type, a current which is called an excitation current which does not depend on a load current flows. The excitation current flows through the primary side even during no load and causes loss in the primary side, and therefore efficiency lowers particularly during a light load. For that reason, for example, in Japanese Laid-Open Patent Application (JP-A) 2013-143877, a method in which in the switching power source of the current resonance type, the excitation current is decreased by switching a resonance capacitor depending on a status of the load has been proposed.

As described above, in the power source device of the current resonance type, a predetermined excitation current always flows through the primary side of the transformer, and therefore with a lower secondary-side load (e.g., during a light load), a proportion of the excitation current to an entirety of a current flowing through the primary side becomes dominant and thus efficiency lowers. Such a characteristic is exhibited. For that reason, in recent years, from the viewpoint of energy saving, high efficiency during the light load is desired, so that a reduction in excitation current which does not depend on the secondary-side load current has been required during the light load. Further, in the method proposed in JP-A 2013-143877, a resonance capacitor is added, whereby there is a need to ensure an area for mounting the resonance capacitor on a substrate, so that an improvement for further downsizing the power source device has been required.

In FIG. 2, (a) is a circuit diagram showing a circuit constitution of a power source device 129 including a conventional current resonance circuit. In FIG. 13, (a) to (c) are equivalent circuits of (a) of FIG. 12. In (a) of FIG. 12, a high-side FET 104 and a low-side FET 105 are alternately driven. As a result, a current flows through secondary winding 106c of a transformer 106 during drive of the FET 104, so that electric power is supplied to a secondary-side load via a diode 108. On the other hand, the current flows through secondary winding 106d of the transformer 106 during drive of the FET 105, so that electric power is supplied to the secondary-side load via a diode 109. In drive control of the FET 104 and the FET 105, a dead time in which both of the FET 104 and the FET 105 are in a non-conduction state is set for a predetermined period. Further, during the period of the dead time, a capacitor (not shown) parallel-connected with the FET is charged and discharged, so that not only prevention of a flow of a large through-current due to a conduction state of both of the FETs 104 and 105 established at the same time but also a switching operation with a low noise are realized.

In FIG. 14, (a) is a diagram showing current waveforms Idh and Idl flowing through the FETs 104 and 105 when a predetermined load is connected in the secondary side. In FIG. 14, (b) is a diagram showing the current waveforms shown in (a) of FIG. 14 in such a state that each current waveform is divided into a current waveform of an excitation current and a current waveform of a load current, wherein A (hatched portion) represents a load current portion and B (dotted line portion) represents an excitation current portion. Detailed description of FIGS. 12 and 14 will be made later. A current which is the sum of the load current portion A and the excitation current portion B flows through primary winding of the transformer 106. The excitation current is a current which does not contribute to a load and is consumed in the primary side, and flows through the primary winding also during no load. However, when the excitation current is larger, a suppliable maximum load current can be made larger. On the other hand, when the suppliable maximum load current is made large, primary-side loss due to the excitation current becomes large, so that a problem that efficiency lowers particularly during the light load occurs.

SUMMARY OF THE INVENTION

The present invention is capable of improving efficiency during a light load.

In order to solve the above-described problem, according to an aspect of the present invention, there is provided a power source device comprising: a transformer in which a primary side and a secondary side are insulated from each other; a first switching element and a second switching element which are connected in series; a resonance capacitor connected in series with a primary winding of the transformer; wherein one end of the second switching element is connected with one end portion of the primary winding different from the other end portion of the primary winding connected with the resonance capacitor, wherein the other end of the second switching element is connected with one end portion of the resonance capacitor different from the other end portion of the resonance capacitor connected with the primary winding, and wherein the primary winding and the resonance capacitor are resonated with each other by alternately operating the first switching element and the second switching element to supply electric power to a load connected with a secondary winding of the transformer, a switch for connecting and disconnecting between the primary winding and the resonance capacitor, wherein the primary winding includes a first primary winding and a second primary winding, and wherein depending on the load, the switch connects or disconnect between the first primary winding and the resonance capacitor, or connects or disconnects between the second primary winding and the resonance capacitor.

According to another aspect of the present invention, there is provided an image forming apparatus comprising: an image forming portion for forming an image; and a power source device for supplying electric power to the image forming apparatus, wherein the power source device includes, a transformer in which a primary side and a secondary side are insulated from each other, a first switching element and a second switching element which are connected in series, a resonance capacitor connected in series with a primary winding of the transformer, wherein one end of the second switching element is connected with one end portion of the primary winding different from the other end portion of the primary winding connected with the resonance capacitor, wherein the other end of the second switching element is connected with one end portion of the resonance capacitor different from the other end portion of the resonance capacitor connected with the primary winding, and wherein the primary winding and the resonance capacitor are resonated with each other by alternately operating the first switching element and the second switching element to supply electric power to a load connected with a secondary winding of the transformer, a switch for connecting and disconnecting between the primary winding and the resonance capacitor, wherein the primary winding includes a first primary winding and a second primary winding, and wherein depending on the load, the switch connects or disconnect between the first primary winding and the resonance capacitor, or connects or disconnects between the second primary winding and the resonance capacitor.

Further features of the present invention will become apparent from the following description of exemplary embodiments with reference to the attached drawings.

DESCRIPTION OF THE EMBODIMENTS

Embodiments of the present invention will be described specifically with reference to the drawings. First, for comparison with current resonance power sources of power source devices in Embodiments of the present invention, a constitution and operation of conventional current resonance power sources will be described with reference to the drawings.

[Constitution and Operation of Conventional Current Resonance Circuits]

Figure 12:
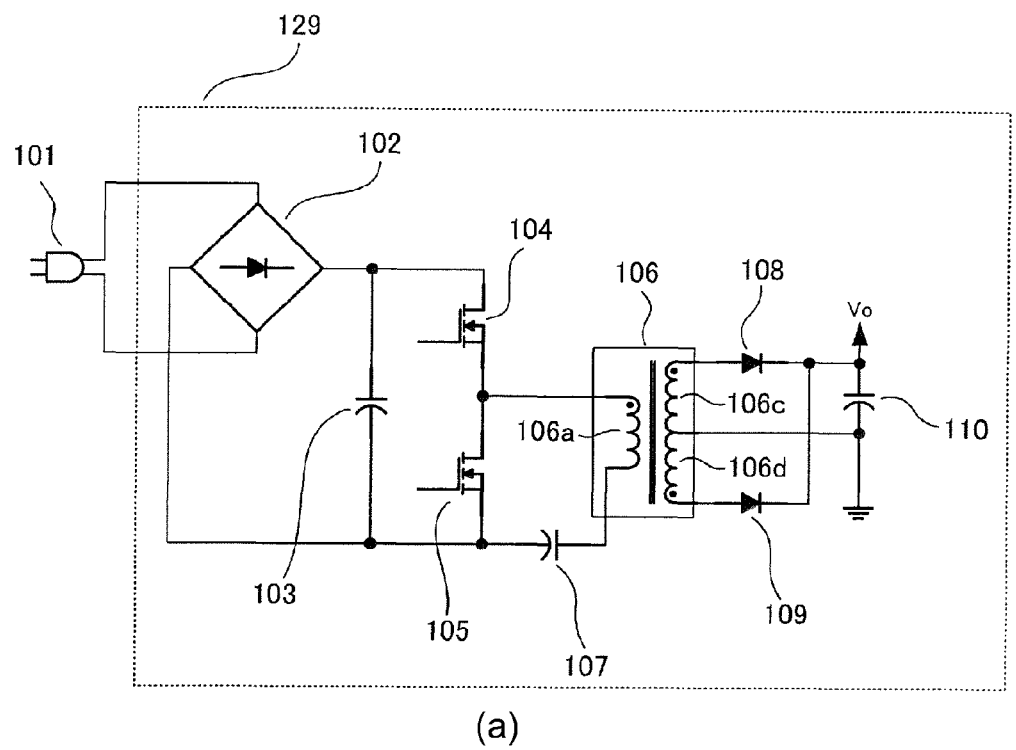
In FIG. 12, (a) is a circuit diagram of a current resonance power source in a conventional example, and (b) is a graph showing an example of a load curve in the conventional example.
Figure 12:
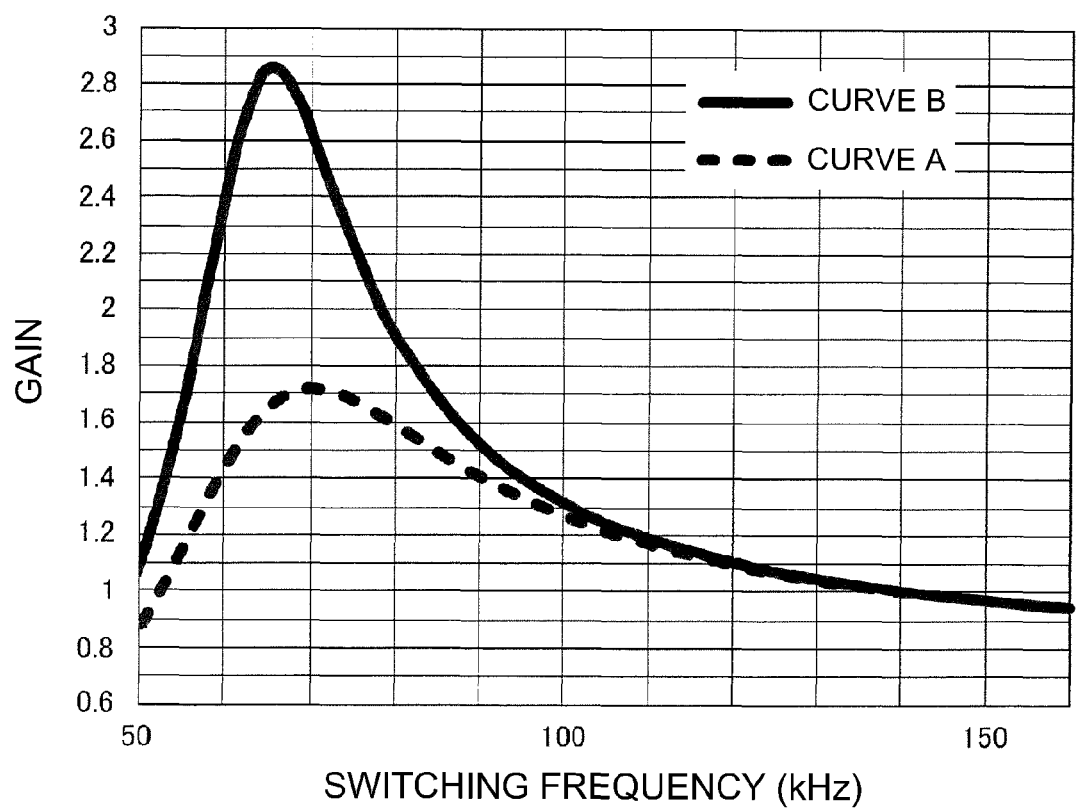

In FIG. 12, (a) is a circuit diagram showing a circuit constitution of the power source device 129 (current resonance power source) including the conventional current resonance circuit. In (a) of FIG. 12, a power source plug 101 is connected with an electrical outlet of an AC power source (voltage source), so that an alternating voltage is supplied to the power source device 129. The supplied alternating voltage is subjected to full wave rectification by a diode bridge 102 and is smoothed by a smoothing capacitor 103. The high-side FET 104 as a first switching means and the low-side FET 105 as a second switching means are series-connected with each other and are parallel-connected with the smoothing capacitor 103. Further, in parallel to the FET 105, primary winding of the transformer 106 and the smoothing capacitor 103 are series-connected with each other. That is, a drain terminal of the FET 105 is connected with one end which is an end portion of the primary winding of the transformer 106, and a source terminal of the FET 105 is connected with the other end of a terminal connected with the primary winding of the transformer 106. A DC voltage smoothened by the smoothing capacitor 103 alternately drives the FET 104 and the FET 105 at a duty of about 50%, so that a square wave voltage is applied to an LC circuit of the resonance capacitor 107 and the transformer 106. As a result, not only a current is caused to flow through the primary winding 106a of the transformer 106 which is a transformer element in which a primary side and a secondary side are insulated with each other, but also electric charges are accumulated in the resonance capacitor 107 which is a capacitance element.

Through the secondary winding 106c of the transformer 106, the current flows during drive of the FET 104, so that the electric power is supplied to the secondary-side load via the diode 108. On the other hand, through the secondary winding 106d of the transformer 106, the current flows during drive of the FET 105, so that the electric power is supplied to the secondary-side load via the diode 109. A secondary-side output voltage Vo is smoothed by a secondary-side smoothing capacitor 110. In drive control of the FET 104 and the FET 105, a dead time in which both of the FETs 104 and 105 are in a non-conduction state is set for a predetermined period. Then, during the period of the dead time, a capacitor (not shown) parallel-connected with the FET 105 is charged and discharged, so that a flow of a large through-current generated due to a simultaneous conduction state between the FETs 104 and 105 is prevented. Thus, a soft switching operation is performed, so that a low-noise switching operation is realized. Incidentally, in (a) of FIG. 12, a control circuit, which is connected with each of gate terminals of the FETs 104 and 105, for controlling the drive of the FETs 104 and 105 is omitted.

(Relationship Between Switching Frequency and Gain)

A relationship between a switching frequency and a gain is an in a characteristic graph shown in (b) of FIG. 12. In (b) of FIG. 12, the abscissa represents a switching frequency (unit: kHz) and the ordinate represents a gain, and a load curve A indicated by a broken line shows the relationship between the switching frequency and the gain during a heavy load and a load curve B indicated by a solid line shows the relationship between the switching frequency and the gain during a light load. A necessary gain varies depending on an input voltage of the transformer and a secondary-side load. Further, in order to prevent out-of-resonance, there is a need to effect control at a frequency higher than a frequency at which the gain shows a peak value in the load curve. For example, in the load curve A, the necessary gain is small when the input voltage is high, and therefore the frequency is controlled at a high level. When the input voltage is low, the necessary gain is large, and therefore the frequency is controlled at a low level. In the case where the input voltage is constant, also the necessary gain is constant, and therefore the control is effected at a frequency where each load curve crosses the same gain. For example, in (b) of FIG. 12, in the case where the gain with respect to the input voltage is 1.6, during the light load, the control is effected at about 88 kHz which is the frequency where the gain crosses the load curve B, and during the heavy load, the control is effected at about 80 kHz which is the frequency where the gain crosses the load curve A. Thus, by changing the control frequency against a fluctuation of the input voltage and the secondary-side load, the control is effected so as to provide a certain output voltage Vo.

(Equivalent Circuit of Current Resonance Circuit)

Figure 13:
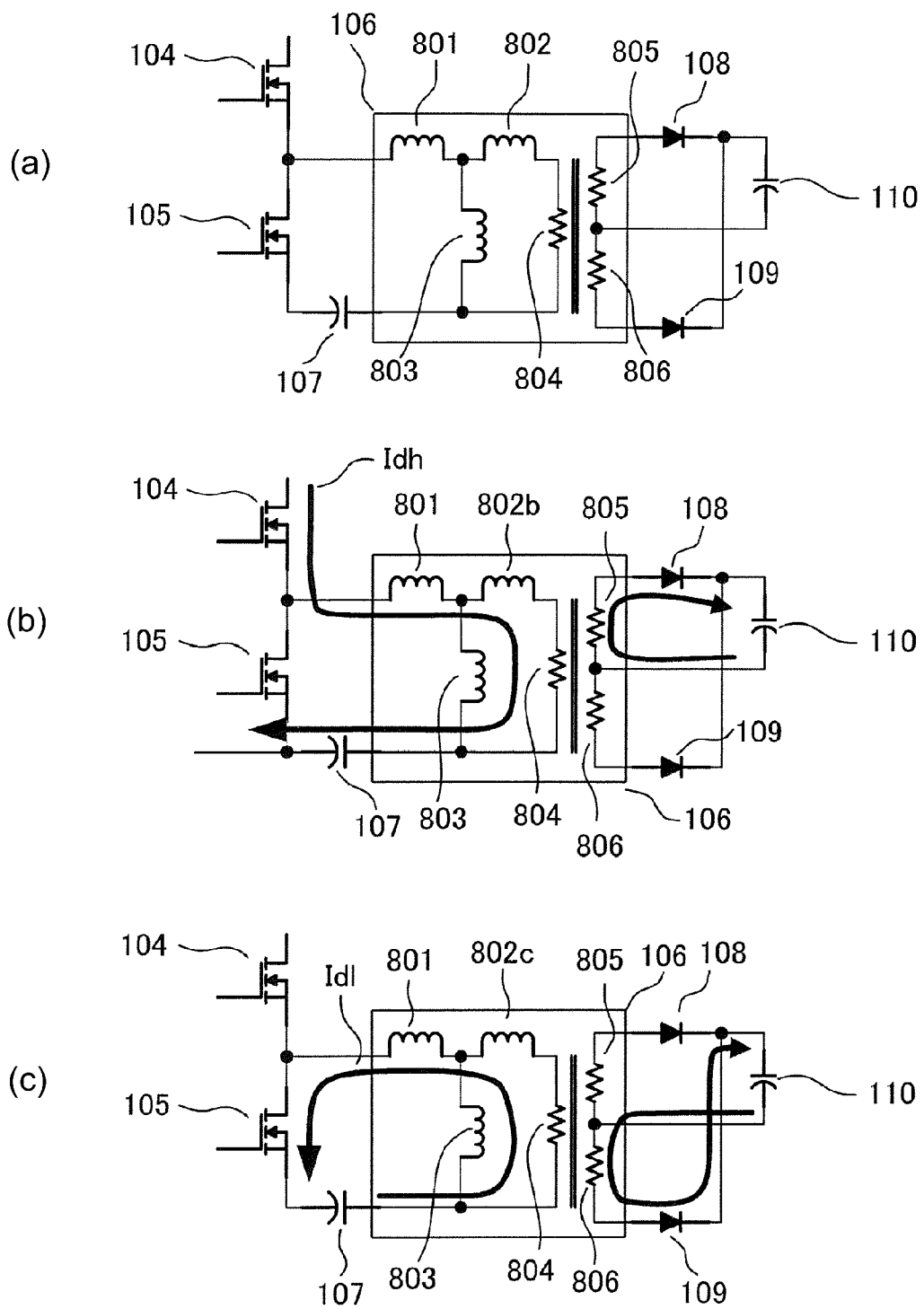
In FIG. 13, (a) to (c) are circuit diagrams each showing the current resonance power source in the conventional example.

In FIG. 13, (a) to (c) are circuit diagrams of the power source device 129, in which the transformer 106 in (a) of FIG. 12 is represented by an equivalent circuit. In FIG. 13, circuit elements identical to those in (a) of FIG. 12 are represented by the same reference numerals or symbols, and a part of the circuit constitution of (a) of FIG. 12 is omitted. In (a) of FIG. 13, a primary side of the transformer 106 is constituted by leakage inductances 801, 802, an excitation inductance 803, and a DC resistor 804. The leakage inductance 801 is a primary-side leakage inductance, and in the power source device 129, the primary-side leakage inductance 801 is used in a circuit operation, and therefore is necessary element. The leakage inductance 802 is a leakage inductance converted as a primary-side leakage inductance from the secondary-side leakage inductance. On the other hand, a secondary side of the transformer 106 is constituted by DC resistors 805, 806. The DC resistor 805 is a DC resistor of secondary winding for positive-side output, and the DC resistor 806 is a DC resistor of secondary winding for negative-side output. The positive-side output is an output in the case where a primary-side current of the transformer 106 is caused to flow from a midpoint of the FETs 104, 105 to the resonance capacitor 107 via the primary winding. On the other hand, the negative-side output is an output in the case where the primary-side current of the transformer 106 is caused to flow from the resonance capacitor 107 to the midpoint of the FETs 104, 105 via the primary winding.

In FIG. 13, (b) is a diagram for illustrating a flow of a current in each of the primary side and the secondary side of the transformer in the positive-side output of the transformer 106 during drive (conduction) of the FET 104. When the FET 104 is in a conduction state, a current Idh for which the smoothing capacitor 103 is a voltage source flows through the resonance capacitor 107 via the FET 104 and the power source of the transformer 106, so that predetermined electric charges are accumulated in the resonance capacitor 107. As a result, a voltage is gained in an anode terminal side of the diode 108, so that electric power is supplied to the secondary-side load via the diode 108. At this time, the leakage inductance 802b of the secondary winding 106c converted into the primary-side leakage inductance is converted into a value which is the square of a turn ratio between the primary winding 106a and the secondary winding 106c, and exists in the primary side of the transformer 106.

Next, in FIG. 13, (c) is a diagram for illustrating a flow of a current flowing through each of the power source and the secondary side of the transformer in the negative-side output of the transformer 106 during drive (conduction) of the FET 105. When the FET 105 is in a conduction state, the voltage charged in the resonance capacitor 107 in (b) of FIG. 13 is used as the voltage source and a current Idl flows through the primary side of the transformer 106 in a direction opposite to the direction in (b) of FIG. 13. That is, from a terminal of the resonance capacitor 10 in the transformer 106 side, the current flows in a route returning to the resonance capacitor 107 via the primary side of the transformer 106 and the FET 105. As a result, a voltage is gained in an anode terminal side of the diode 109, so that electric power is supplied to the secondary-side load via the diode 109. At this time, the leakage inductance 802c of the secondary winding 106d converted into the primary-side leakage inductance is converted into a value which is the square of a turn ratio between the primary winding 106a and the secondary winding 106d, and exists in the power source of the transformer 106.

(Excitation Current and Load Current)

Figure 14:
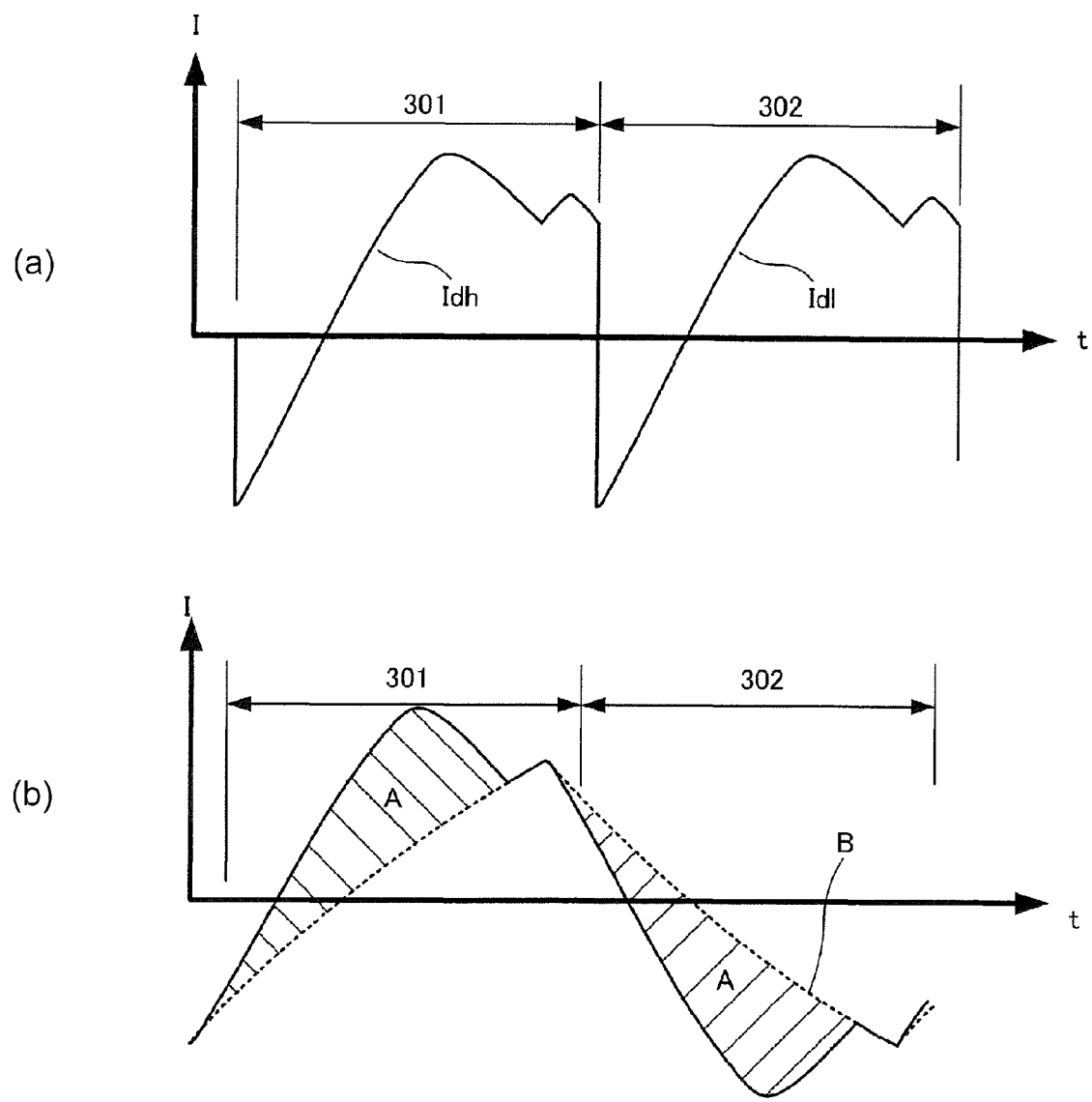
In FIG. 14, (a) and (b) are diagrams each showing FET current waveforms of the current resonance power source in the conventional example.

In FIG. 14, (a) is a diagram showing waveforms of the currents Ihd, Idl flowing through the FETs 104, 105 when a predetermined load is connected with the secondary side of the transformer 106, in which the abscissa represents a time (t), and the ordinate represents a current (I). In FIG. 14, (a) shows the current waveforms of the FETs 104, 105, and the current Idh is a current flowing through the FET 104 in a period 301 during the conduction state of the FET 104, and the current Idl is a current flowing through the FET 105 in a period 302 during the conduction state of the FET 105.

Each of the currents Idh, Idl can be divided into an excitation current and a load current. In FIG. 14, (b) is a diagram in which each of the current waveforms shown in (a) of FIG. 14 is divided into current waveforms of the excitation current and the load current when the predetermined load is connected with the secondary side of the transformer 106, in which A (hatched portion) shows a load current portion, and B (dotted line portion) shows an excitation current portion. A current which is the sum of the load current portion A and the excitation current portion B flows through the primary winding of the transformer 106. In FIG. 14, (b) is a diagram showing a waveform of a current flowing through the resonance capacitor 107 simultaneously with the primary winding of the transformer 106, in which the current flowing from the primary winding 106a in a source terminal direction of the FET 105 via the resonance capacitor 107 is shown as a positive-side (+ side) current. The direction of the current flowing through the primary winding of the transformer 106 during the conductive state of the FET 104 and that during the conduction state of the FET 105 are opposite to each other, and therefore the current waveform in (b) of FIG. 14 is a waveform in which the sign of the current in the period 301 and that in the period 302 are opposite from each other.

The excitation current is loss which does not contribute to the load, and is consumed in the primary side of the transformer 106, and flows through the primary winding also during no load. However, there is a problem such that a suppliable maximum load current can be made larger when the excitation current is larger, and on the other hand, when the suppliable maximum load current is made large, the loss in the primary side due to the excitation current becomes large and thus efficiency lowers particularly during the light load.

Embodiment 1

[Switching Circuit]

Figure 1:
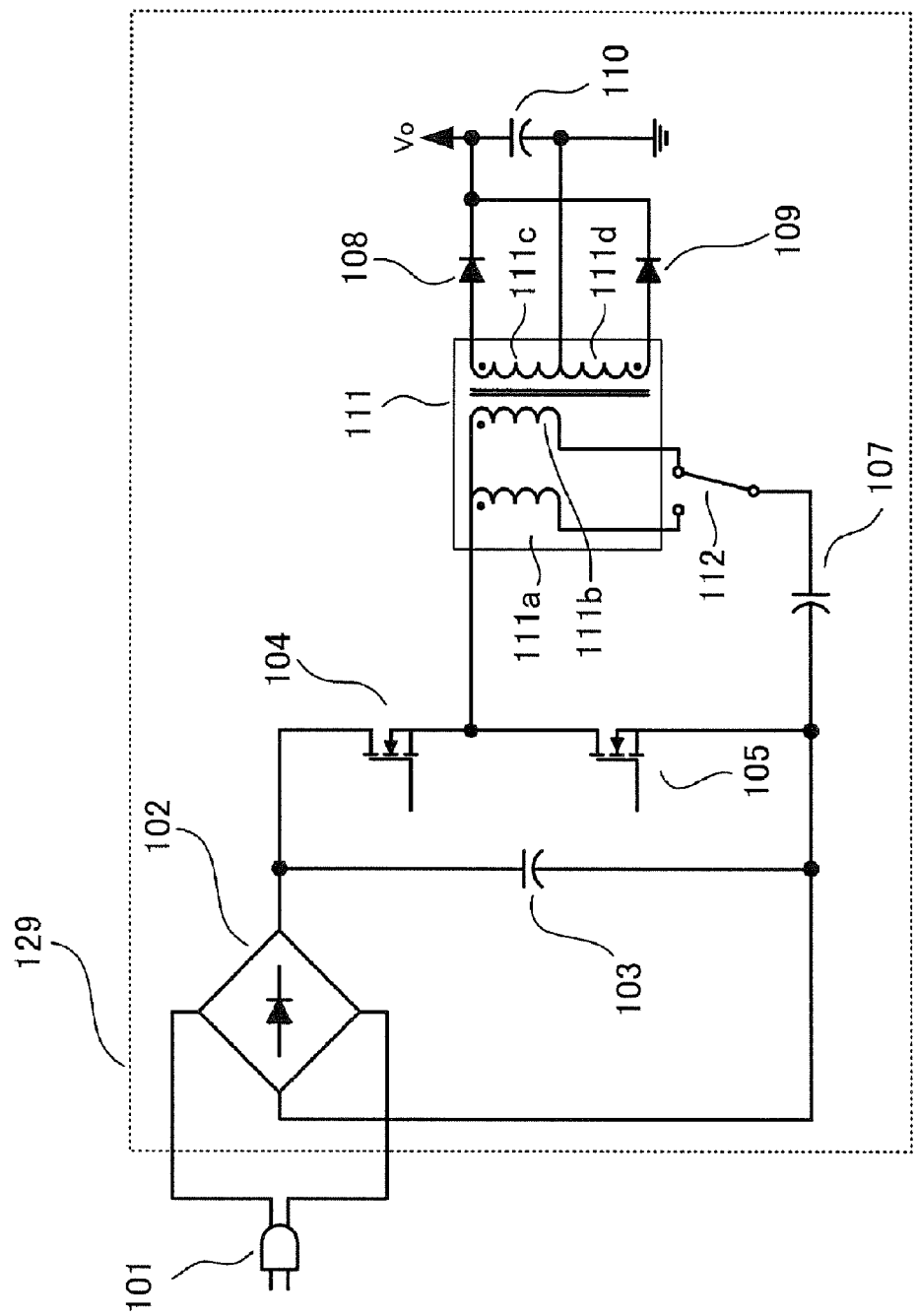
FIG. 1 is a circuit diagram of a power source device in Embodiment 1.

FIG. 1 is a circuit diagram showing a circuit constitution of the power source device 129 including a current resonance circuit in Embodiment 1. A difference from the power source device 129 in the conventional example described with reference to (a) of FIG. 12 is that a transformer 111 is used in place of the transformer 106 and that a constitution of primary winding of the transformer 111 is changed from that of the transformer 106 and a switch 112 for switching the primary winding is added. In FIG. 1, the transformer 111 is a current resonance transformer, first primary winding 111a is primary winding used during the light load, and second primary winding 111b is primary winding used during the heavy load. In this embodiment, a difference from the primary winding of the transformer 106 in the conventional example is that the primary winding 111a for the light load is added. Further, a constitution of the secondary winding of the transformer 111 is the same as that of the transformer 106, but secondary winding 111c is used in place of the secondary winding 106c in (a) of FIG. 12 and secondary winding 111d is used in place of the secondary winding 106d in (a) of FIG. 12. In FIG. 1, circuit constituent elements identically to those in the circuit of (a) of FIG. 12 described above are represented by the same reference numerals or symbols and will be omitted from description in this embodiment.

The switch 112 is a switching means for switching the two primary windings 111a, 111b, and in this embodiment, a relay element having two contacts is used. The switch 112 is connected with the resonance capacitor 107 at one end and is connectable with either one of the primary winding 111a and the primary winding 111b at the other end. Incidentally, in FIG. 1, a circuit for controlling the switch 112 constituted by the relay element is omitted. In actuality, a time for turning off or on the switch 112 as a relay is needed. For that reason, in the circuit of FIG. 1, it is desirable that a mode is divided into a mode during the light load and a mode during the heavy load, and when the mode is switched, a predetermined time is provided between the modes and the switch 112 is turned on or off. However, even when the switch 112 is switched during a switching operation between the FET 104 and the FET 105, in the case where there is no obstacle to device rating or the like, the constitution is not limited thereto.

[Inside Constitution of Transformer]

Figure 2:
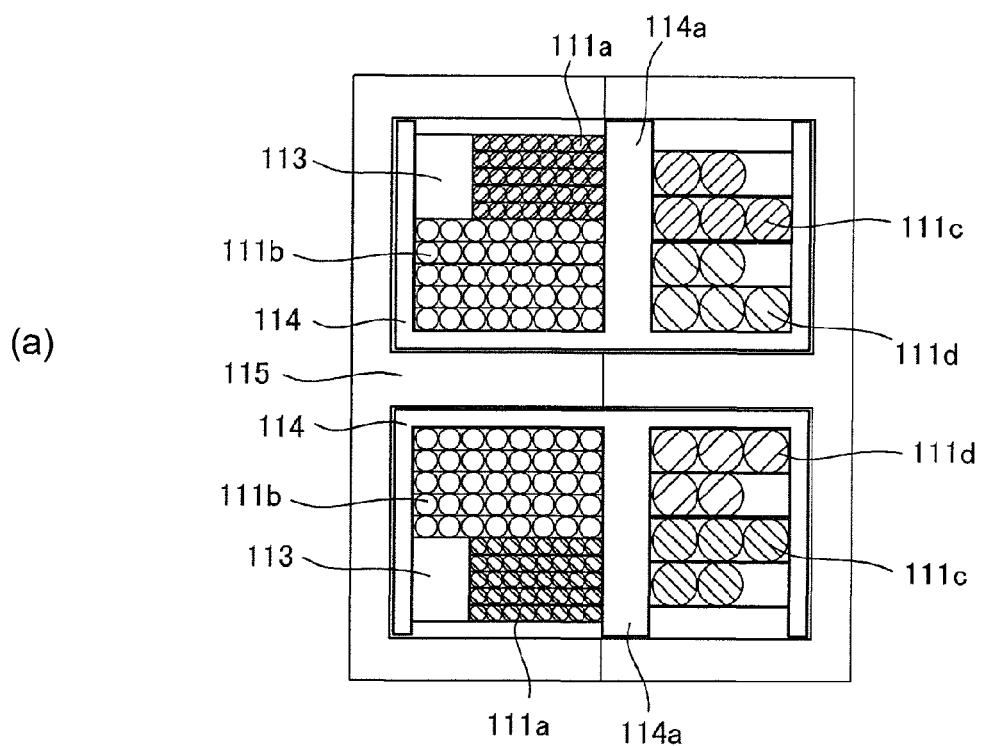
In FIG. 2, (a) is a diagram showing an inside constitution of a transformer in Embodiment 1, and (b) is a graph for illustrating an output characteristic curve in Embodiment 1.
Figure 2:
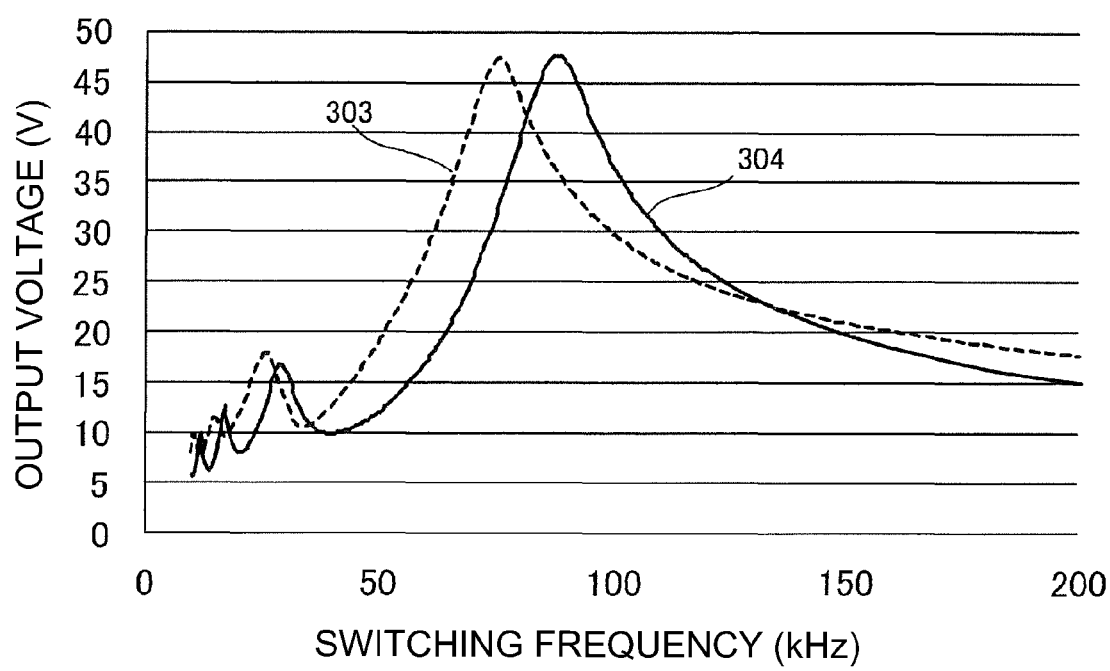

In FIG. 2, (a) is a sectional view, showing a cross-section of the transformer 111, for illustrating an inside constitution of the transformer 111 shown in FIG. 1. The transformer 111 is a transformer of a division type and includes a partition portion 114a for partitioning regions of the primary winding and the secondary winding. In (a) of FIG. 12, a spacer 113 is provided not only for bringing the primary winding 111a for the light load near to the secondary windings 111c, 111d but also for stabilizing a position of the primary winding 111a. As the spacer 113, a thick tape may be wound or a thin tape may also be wound plural times. About a bobbin 114, the primary windings 111a, 111b and the secondary windings 111c, 111d are wound, and a core 115 inserted and fixed to the bobbin 114 is formed of a magnetic material.

As shown in (a) of FIG. 2, with respect to a central partition portion 114a of the bobbin 114, the primary windings 111a, 111b are wound in a left-hand side of the figure, and the secondary windings 111c, 111d are wound in a right-hand side in the figure. Further, the primary winding 111b for the heavy load is wound about the bobbin 114, and the primary winding 111a for the light load is wound outside the primary winding 111b. Further, the secondary winding 111d is wound about the bobbin 114, and the secondary winding 111c is wound outside the secondary winding 111c. As shown in (a) of FIG. 2, compared with the primary winding 111b for the heavy load, the primary winding 111a for the light load is close to the secondary windings 111c, 111d, and therefore a coupling coefficient showing a degree of coupling (connection) between the primary winding and the secondary winding becomes high, so that the leakage inductance becomes small. Further, in this embodiment, the number of turns of the primary winding 111a for the light load and the number of turns of the primary winding 111b for the heavy load are made equal to each other, and therefore primary inductance values are almost the same.

Here, in FIG. 1, an example of circuit constants of the transformer 111 when the primary winding of the transformer 111 is connected in the primary winding 111b side for the heavy load is shown. At this time, a primary inductance is 210 µH, a leakage inductance is 70 µH, a capacity of the resonance capacitor is 30 nF, the number of turns of the primary winding 111b is 40 turns, and the number of turns of each of the secondary windings 111c, 111d is 5 turns. Specifically, these circuit constants include those of the secondary-side leakage inductance converted into the primary-side leakage inductance. This condition is referred to as a condition (A). In the condition (A), a ratio of the leakage inductance and the primary inductance is 1:3 (=70 µH:210 µH). The resonance frequency at this time is 109.8 kHz. A resonance frequency f by the leakage inductance and the resonance capacitor is represented by the following formula (1) when the leakage inductance is Le and the resonance capacitor is Cr.

$$f = \frac{1}{2\pi\sqrt{L_e C_r}} \quad (1)$$

When consideration is made under a condition that a voltage between terminals of the smoothing capacitor 103 is 325 V and the current voltage Vo is 25 V, according to a simulation result, the excitation current at this time is about 1.38 A when a secondary-side load current of 1 A is outputted.

Next, an example of the circuit constants of the transformer 111 when the primary winding of the transformer 111 is connected in the primary winding 111a side for the light load in FIG. 1 is shown. At this time, the primary inductance is 210 µH and the leakage inductance is 42 µH. Other conditions are the same as those in the above-described condition (A), and the condition in this case is referred to as a condition (B). When consideration is made under the condition that the voltage between terminals of the smoothing capacitor 103 is 325 V and the output voltage Vo is 25 V, according to a simulation result, the excitation current at this time is about 1.16 A when the secondary-side load current of 1 A is outputted, so that it is understood that the excitation current decreases compared with the case of the condition (A). In the case of the condition (B), a ratio of the leakage inductance and the primary inductance is 1:5 (=42 µH:210 µH). At this time, the resonance frequency f is 141.8 kHz.

Next, an example of the circuit constants of the transformer 111 when the primary winding of the transformer 111 is connected in the primary winding 111b side for the heavy load in FIG. 1 is shown. At this time, the primary inductance is 210 μH and the leakage inductance is 70 μH, and the capacity of the resonance capacitor 107 is 22 nF. Other conditions are the same as those in the above-described condition (A), and the condition in this case is referred to as a condition (C). When consideration is made under the condition that the voltage between terminals of the smoothing capacitor 103 is 325 V and the output voltage Vo is 25 V, according to a simulation result, the excitation current at this time is about 1.20 A when the secondary-side load current of 1 A is outputted. In the case of the condition (C), a ratio of the leakage inductance and the primary inductance is 1:3 (=70 μH:210 μH). At this time, the resonance frequency f is 128.3 kHz.

[Frequency-Current Voltage Characteristic]

In FIG. 2, (b) is a graph showing an example of output characteristic curves under the above-described conditions (B) and (C) in the case where the secondary-side current voltage Vo is 25 V and the load current of 10 A is outputted, in which the abscissa represents the switching frequency (unit: kHz) and the ordinate represents the current voltage Vo (unit: V). In (b) of FIG. 2, an output characteristic curve 303 indicated by a broken line shows an output characteristic in the case of the above-described condition (B), and an output characteristic curve 304 indicated by a solid line shows an output characteristic in the case of the above-described condition (C). In this instance, both of maximum output voltages which are peak portions of the output voltages of the output characteristics of the two output characteristic curve 303, 304 are about 46.5 V and thus are substantially the same. As described above, the excitation current in the case of the condition (B) decreases more than the case of the condition (C), and therefore according to the simulation result, the following is understood. That is, as regards parameters having the same peak characteristic, it is understood that the excitation current decreases in the case where the primary winding is switched to the primary winding 111a for the light load as in the condition (B) than in the case where the capacity of the resonance capacitor 107 is changed as in the CD (C).

In this embodiment, the primary winding 111a for the light load and the primary winding 111b for the heavy load had the same primary inductance value. However, the primary inductance can also be changed as shown in a formula (2) below. Specifically, when permeability of the core 115 is μ, the number of turns of the primary winding is N, a cross-sectional area of the case 115 is S, and a magnetic path length is lm, a primary inductance L in the case where there is no gap in the core 115 can be represented by the following formula (2).

$$L = \frac{\mu N^2 S}{l_m} \quad (2)$$

From the formula (2), it is understood that for example, when the number of turns of the primary winding is increased, it is understood that for example, when the number of turns of the primary winding is increased, the primary inductance can be made large.

[Another Inside Constitution of Transformer]

Figure 3:
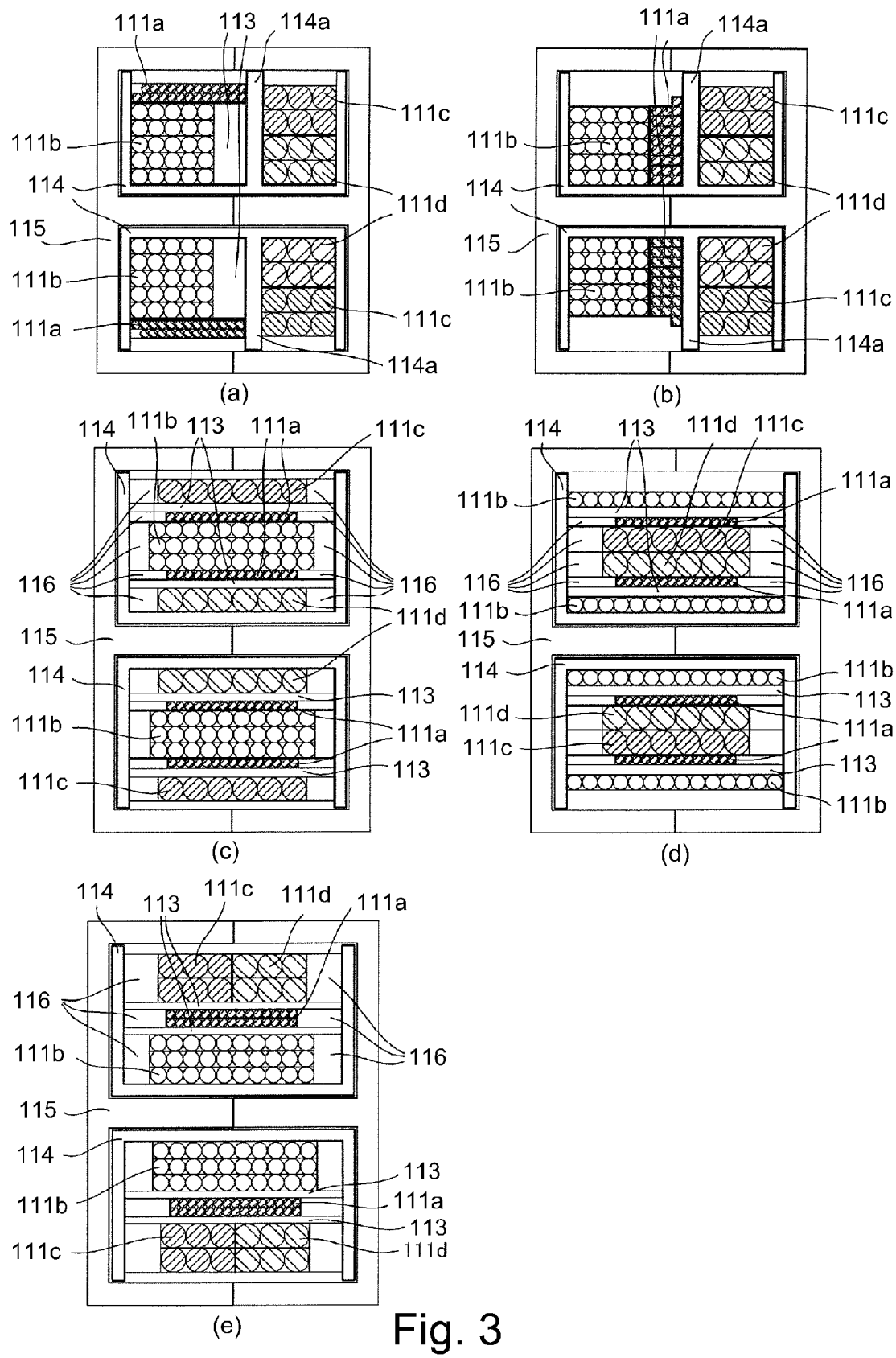
In FIG. 3, (a) to (e) are diagrams each showing an inside constitution of a transformer in Embodiment 1.

Examples of the inside constitutions of the primary winding and the secondary winding of the transformer 111 are shown in (a) to (e) of FIG. 3. In (a) and (b) of FIG. 3, transformers of a division type in which the partition portion 114a is provided at a central portion of the bobbin 114 are used, and in (c) to (e) of FIG. 3, transformers of a lamination type in which no partition portion is provided in the bobbin 114 are used. The transformer 111 shown in FIG. 3 employs, similarly as in (a) of FIG. 2, an inside constitution such that the leakage inductance of the primary winding 111b for heavy load is increased. As a result, the excitation current becomes large, so that the suppliable maximum load current can be further increased. In FIG. 3, (a) and (b) are modified embodiments of the inside constitution of the transformer shown in (a) of FIG. 2. In (a) of FIG. 3, with respect to the central partition portion 114a of the bobbin 114, the primary windings 111a, 111b are wound in the left-hand side in the figure, and the secondary windings 111c, 111d are wound in the right-hand side in the figure. Further, the primary winding 111b for the heavy load wound about the bobbin 114, and the primary winding 111a for the light load is wound outside the primary winding 111b. Further, between the primary winding 111b and the partition portion 114a of the bobbin 114, the spacer 113 is inserted, so that compared with the primary winding 111a, a distance between the primary winding 111b and the secondary windings 111c, 111d is increased. The secondary winding 111d is wound about the bobbin 114, and the secondary winding 111c is wound outside the secondary winding 111d.

In (b) of FIG. 3, with respect to the central partition portion 114a of the bobbin 114, the primary windings 111a, 111b are wound in the left-hand side in the figure, and the secondary windings 111c, 111d are wound in the right-hand side in the figure. Further, with respect to the bobbin 114, the primary winding 111a for the light load wound in the partition portion 114a side of the bobbin 114, and the primary winding 111b for the heavy load is wound in a side remote from the partition portion 114a of the bobbin 114 so as to be adjacent to the primary winding 111a. The secondary winding 111d is wound about the bobbin 114, and the secondary winding 111c is wound outside the secondary winding 111d.

In (a) and (b) of FIG. 3, compared with the primary winding 111b for the heavy load, the primary winding 111a for the light load is wound closely to the secondary windings 111c, 111d, and therefore the leakage inductance becomes small, so that the excitation current can be made small. In (a) of FIG. 3, the leakage inductance is increased by disposing the spacer 113 between the primary winding 111b for the heavy load and the secondary windings 111c, 111d. In (b) of FIG. 3, the leakage inductance is made small compared with the primary winding 111b by winding the primary winding 111a for the light load along the bobbin 114 closely to the secondary windings 111c, 111d. On the other hand, the primary winding 111b for the heavy load is wound in a side remote from the secondary windings 111c, 111d with respect to the primary winding 111a for the light load, so that a distance from the secondary windings 111c, 111d is increased, and therefore the leakage inductance becomes large compared with the primary winding 111a.

In FIG. 3, (c) to (e) are examples in which the lamination-type transformers are used. The bobbin 114 of the lamination-type transformer is different from the bobbin 114 including the partition portion 114a at the central portion used in (a) and (b) of FIG. 3, and is not provided with the partition portion 114a. For this reason, in the lamination-type transformer, a structure in which the primary windings 111a, 111b and the secondary windings 111c, 111d are superposedly wound is formed. In (c) to (e) of FIG. 3, an insulating tape 116 is used for ensuring an insulation distance of the primary winding 111a for the light load and the primary winding 111b for the heavy load from the secondary windings 111c, 111d.

In (c) of FIG. 3, in an order from an inner layer of the bobbin 114, the secondary winding 111d, the primary winding 111a, the primary winding 111b, the primary winding 111a and the secondary winding 111c are wound. As a result, a structure in which the primary windings 111a for the light load and the primary winding 111b for the heavy load are sandwiched between the secondary windings 111c, 111d and in which the primary winding 111b is sandwiched between the primary windings 111a is formed. Further, by spacers 113, spaces are formed between the primary windings 111a, 111b and the secondary windings 111c, 111d, so that necessary leakage inductance is generated.

In (d) of FIG. 3, in an order from an inner layer of the bobbin 114, the primary winding 111b, the primary winding 111a, the secondary winding 111c, the primary winding 111a and the primary winding 111b are wound. As a result, a structure in which the secondary winding 111c, 111d are sandwiched between the primary winding 111a and in which the primary winding 111a and the secondary windings 111c, 111d are sandwiched between the primary windings 111b is formed. In the case where the leakage inductance by the primary winding 111a for the light load is intended to be further decreased or the leakage inductance by the primary winding 111b for the heavy load is intended to be further increased compared with (c) of FIG. 3, the constitution as in (d) of FIG. 3 may also be employed. That is, the spacer 113 may be provided between the primary winding 111a for the light load and the primary winding 111b for the heavy load, and the spacer 113 may also be provided between the secondary windings 111c, 111d and the primary winding 111a for the light load. Further, in FIG. 3, (e) shows a structure in which in an order from an inner layer of the bobbin 114, the primary winding 111b for the heavy load, the primary winding 111a for the light load and the secondary windings 111c, 111d are wound. The spacer 113 is provided between the primary winding 111a for the light load and the primary winding 111b for the heavy load, and the spacer 113 is provided between the secondary windings 111c, 111d and the primary winding 111a for the light load. As a result, similarly as in (d) of FIG. 3, the leakage inductance by the primary winding 111a for the light load is further decreased, or the leakage inductance by the primary winding 111b for the heavy loads is further increased. Each of the secondary windings 111c, 111d is separated into two layers, but as in the case of (c) and (d) of FIG. 3, each of the secondary windings 111c, 111d may also be wound in a single layer.

The inside constitution of the transformer is not limited to those described above with respect to (a) of FIG. 2 and FIG. 3 and may only be required so that the primary windings for the light load and the heavy load are wound in a manner that the excitation inductances or the leakage inductances are different from each other. For example, the excitation inductance increases when the number of turns of the primary windings increases, and the leakage inductance decreases when the primary winding is disposed closely to the secondary winding. In this embodiment, under a condition that the primary inductances are the same, current values of the excitation current were compared. However, for example, compared with during the heavy load, during the light load, by increasing the primary inductance, the excitation current may also be lowered. Further, also the wire diameters of the primary winding 111a for the light load and the primary winding 111b for the heavy load are changed so as to meet device specifications, so that the wire diameters of the primary windings 111a, 111b may also be made different from each other. By constituting the transformer 111 in such a manner, in the case where the transformer has a bobbin space, it is possible to provide a power source device having good efficiency also during the light load without increasing the size of the transformer. Further, in this embodiment, in order to improve the efficiency during the light load, addition of the resonance capacitor is not made, and therefore it is possible to suppress enlargement of the substrate area.

As described above, according to this embodiment, it is possible to improve the efficiency during the light load.

Embodiment 2

Embodiment 2 will be described with reference to FIG. 4. In the following, circuit constituent elements similar to those in Embodiment 1 are represented by the same reference numerals or symbols and will be omitted from description.
[Switching Circuit 1]

Figure 4:
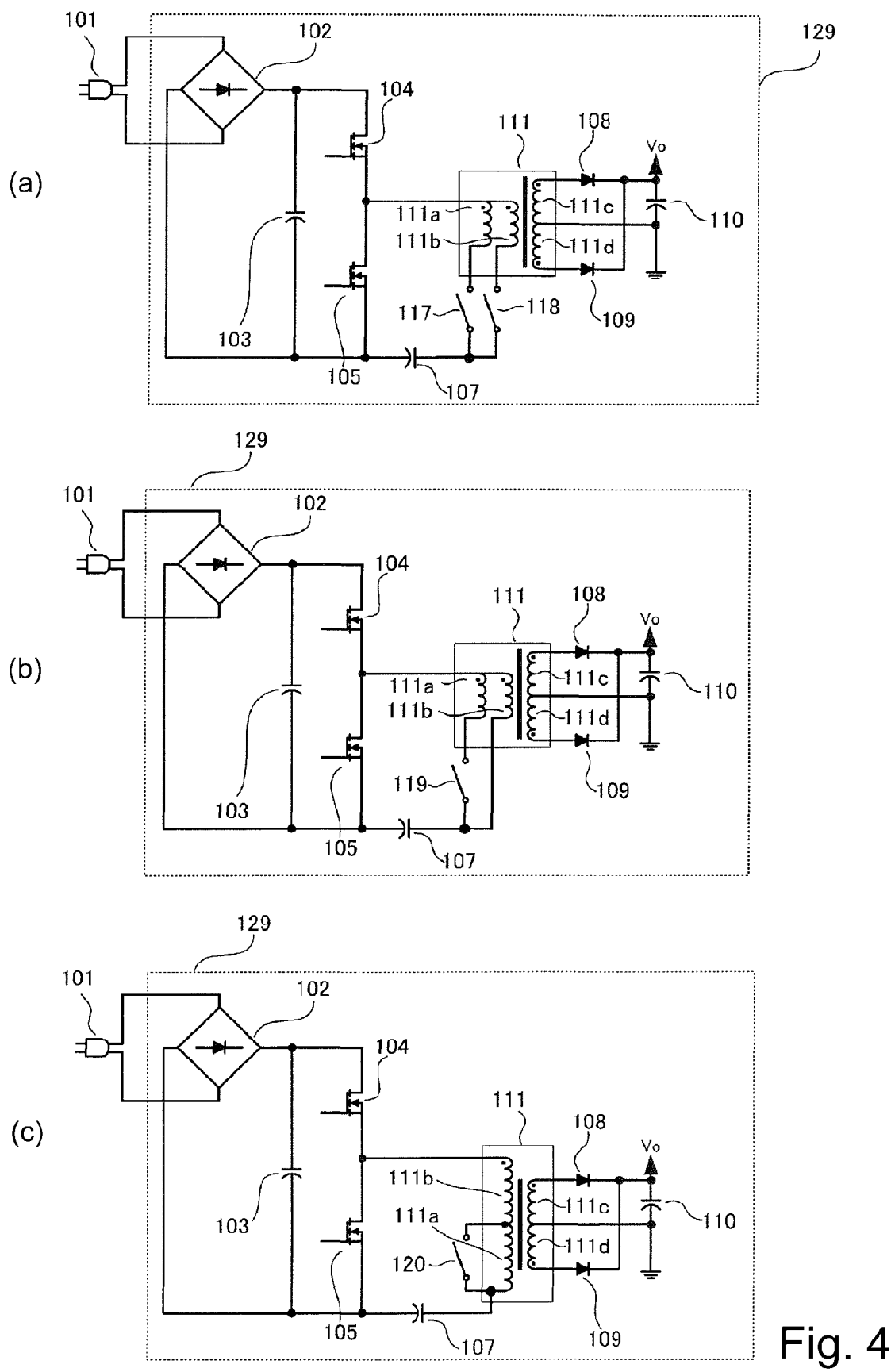
In FIG. 4, (a) to (c) are circuit partitions of a power source device in Embodiment 2.

In FIG. 4, (a) is a circuit diagram showing an example of a primary winding switching circuit of a transformer 111 in this embodiment. In Embodiment 1, the switch 112 which is a switching circuit used the relay element having the two contacts, but in (a) of FIG. 4, a difference is that two switches, i.e., two relays each having a single contact are used in actuality. Of these two switches, a switch 117 as a first switch means is turned on during the light load, and a switch 118 as a second switch means is turned on during the heavy load. As the switches 117, 118, the relays are used, but in (a) of FIG. 4, a circuit for controlling the switches 117, 118 constituted by the relay elements is omitted.

Further, both of the switches 117, 118 can also be turned on, whereby it is possible to set 3 operating modes. In the case where both of the switches 117, 118 are turned on (connected), compared with Embodiment 1, the leakage inductance is smallest, so that the excitation current becomes small and is suitable for the light load. For example, the operating mode is divided into 3 modes for a heavy load, a medium load and a light load. During the heavy load, the switch 118 is turned on, and during the medium load, the switch 117 is turned on. During the light load, the switches 117, 118 are turned on. It is also possible to switch the primary winding by combining the two switches 117, 118, so that the efficiency during the light load can be improved. In the circuit shown in (a) of FIG. 4, compared with FIG. 1 in Embodiment 1, although the number of elements is increased, depending on the load current during the light load, it is possible to select the switch 117 lower in rated current than the switch 118.
[Switching Circuit 2]

In FIG. 4, (b) is a circuit diagram showing another example of the primary winding switching circuit of the transformer 111 in this embodiment. In (b) of FIG. 4, different from the circuit of FIG. 1 in Embodiment 1 and the circuit of (a) of FIG. 4 in this embodiment, a single relay having a single contact is used. In (b) of FIG. 4, the primary winding 111b for the heavy load is always connected, and a switch 119 as the switch means is turned on during the light load and is turned off during the heavy load, so that switching of the connection of the primary windings. In (b) of FIG. 4, in the case where the switch 119 is turned on, the resultant circuit is the same as the circuit in the case where the switches 117, 118 in (a) of FIG. 4 are turned on, so that the efficiency during the light load can be improved. In (b) of FIG. 4, a constitution in which the switch 119 is turned on during the light load is employed, and therefore, similarly as in (a) of FIG. 4, it is possible to select a rated-current switch 119 depending on the load current during the light load.
[Switching Circuit 3]

In FIG. 4, (c) is a circuit diagram showing a further example of the primary winding switching circuit of the transformer 111 in this embodiment. In (c) of FIG. 4, a difference from the above-described embodiments is that a single-contact relay is used as a switch 120 as the switch element and is connected in parallel with the primary winding 111a for the light load. In the circuit of (c) of FIG. 4, by turning on the switch 120 during the heavy load, of the primary windings, only the primary winding 111b for the heavy load is in a connected state. As a result, the primary-side current flows through the primary winding 111b for the heavy load but little flows through the primary winding 111a for the light load. On the other hand, during the light load, the switch 120 is turned off, so that the primary windings have a constitution in which the primary winding 111b for the heavy load and the primary winding 111a for the light load are series-connected with each other, and thus the current flows through the two primary windings 111a, 111b.

A turn ratio Nr can be represented by the following formula (3).

$$Nr = \frac{V_{in}}{2V_o} \cdot M \quad (3)$$

In the formula (3), Vm is an input voltage, Vo is an output voltage, and M is a current voltage gain. By turning on or off the switch 120, the turn ratio is switched based on a change in the number of windings of the primary winding, so that even in the case where an input voltage range is board, it becomes possible to obtain a gain suitable for supplying an output voltage and an output current. Further, during the heavy load, by turning on the switch 120, as shown by the above-described formula (2), the number of windings of the primary winding is decreased, so that the primary inductance can be lowered. As a result, the excitation current is increased, so that it becomes possible to supply a large output current.

Incidentally, in this embodiment or in Embodiment 1, the switching between the primary windings 111a and 111b, the relay as the switch means is used, but the switch means is not limited to the relay. The switch means may only be required to be an element, such as a bi-directional thyristor, capable of causing the current to flow bi-directionally.

As described above, according to this embodiment, it is possible to improve the efficiency during the light load.

Embodiment 3

Embodiment 3 will be described. In Embodiments 1 and 2, the constitution example of the switch means for switching the primary winding was described and a specific circuit constitution for controlling the switch means was omitted. In this embodiment, an actual switch-switching operation will be described with reference to a circuit diagram of a circuit constitution for controlling the switch means.

[Switching Control]

Figure 5:
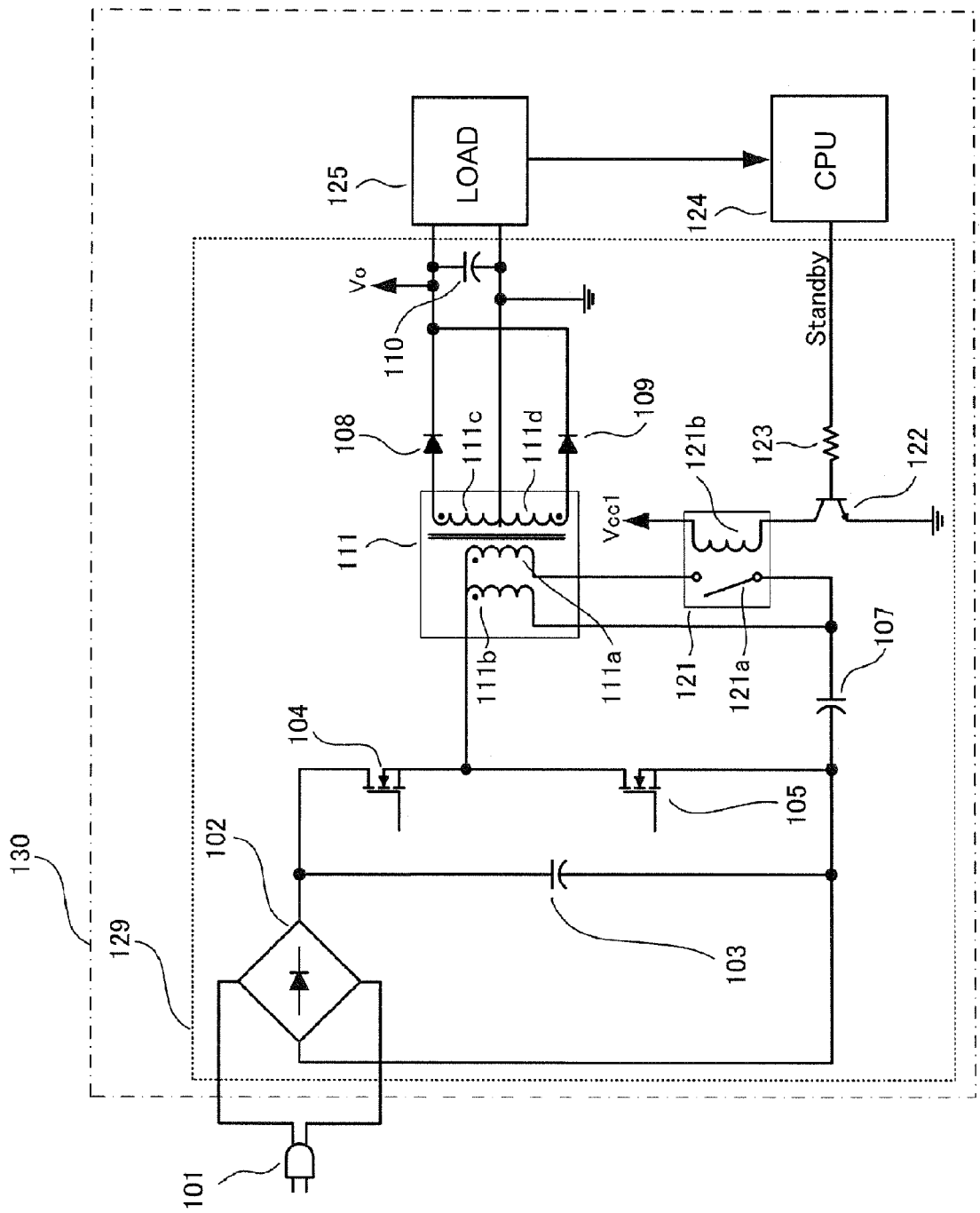
FIG. 5 is a circuit diagram of a power source device in Embodiment 3.

FIG. 5 is a schematic diagram of an electronic device 130 including the power source device 129 in this embodiment. As shown in FIG. 5, the electronic device 130 drives a load 125 which is a secondary-side load by electric power supplied from the power source device 129. The electronic device 130 includes CPU 124 as a control means for controlling an operation of the electronic device 130, and the CPU 124 controls operations in two operating modes, i.e., a normal mode and a stand-by mode, depending on a state of the load 125. The stand-by mode is the operating mode in the case of the light load in which the load 125 to be driven is small, and the normal mode is the operating mode in the case of the heavy load in which the load 125 to be driven is large. Depending on the state of the load 125, the CPU 124 outputs, to the power source device 129, a stand-by signal for indicating the operation in the stand-by mode (light load) or the operation in the normal mode (heavy load).

Then, the circuit constitution of the power source device 129 shown in FIG. 5 will be described. The circuit diagram of the power source device 129 shown in FIG. 5 is a circuit diagram in which a circuit for effecting the control of the switch 119 is added to the above-described circuit of (b) of FIG. 4 of Embodiment 2, and specifically, a relay 121, a transistor 122 and a resistor 123 are added. The relay 121 which is a switch of the switching means is constituted by a switch portion 121a and a coil portion 121b. The transistor 122 which is a control means is a transistor for driving the relay 121, and the resistor 123 is a limiting resistor for limiting a current flowing into a base terminal of the transistor 122. A voltage Vcc1 is a power source voltage for driving the relay 121, and the output voltage Vo may also be used in place of the voltage Vcc1. Further, as described above, the CPU 124 outputs, depending on an operating state of the secondary-side load, the stand-by signal for controlling ON/OFF of the relay 121, to the transistor 122. Incidentally, the elements of the circuit similar to those of the circuit shown in (b) of FIG. 4 of Embodiment 2 are represented by the same numerals or symbols and will be omitted from description.

In FIG. 5, in the case of the stand-by mode in which the load 125 is the light load, the stand-by signal with a high level (Hi state) is outputted from the CPU 124. As a result, a base current flows through the transistor 122, so that the transistor 122 is turned on. Then, the voltage Vcc1 is applied to the coil portion 121b of the relay 121, so that the switch portion 121a is turned on, and thus the current flows through also the primary winding 111a together with the primary winding 111b. On the other hand, in the case of the normal mode in which the load 125 is the heavy load, the stand-by signal with a low level (Low state) is outputted from the CPU 124. As a result, the transistor 122 is in an off state, so that the current does not flow through the coil portion 121b of the relay 121. Therefore, the switch portion 121a is turned off, so that the current does not flow through the primary winding 111a but the current flows through only the primary winding 111b.

[Control of Switching Circuit]

Figure 6:
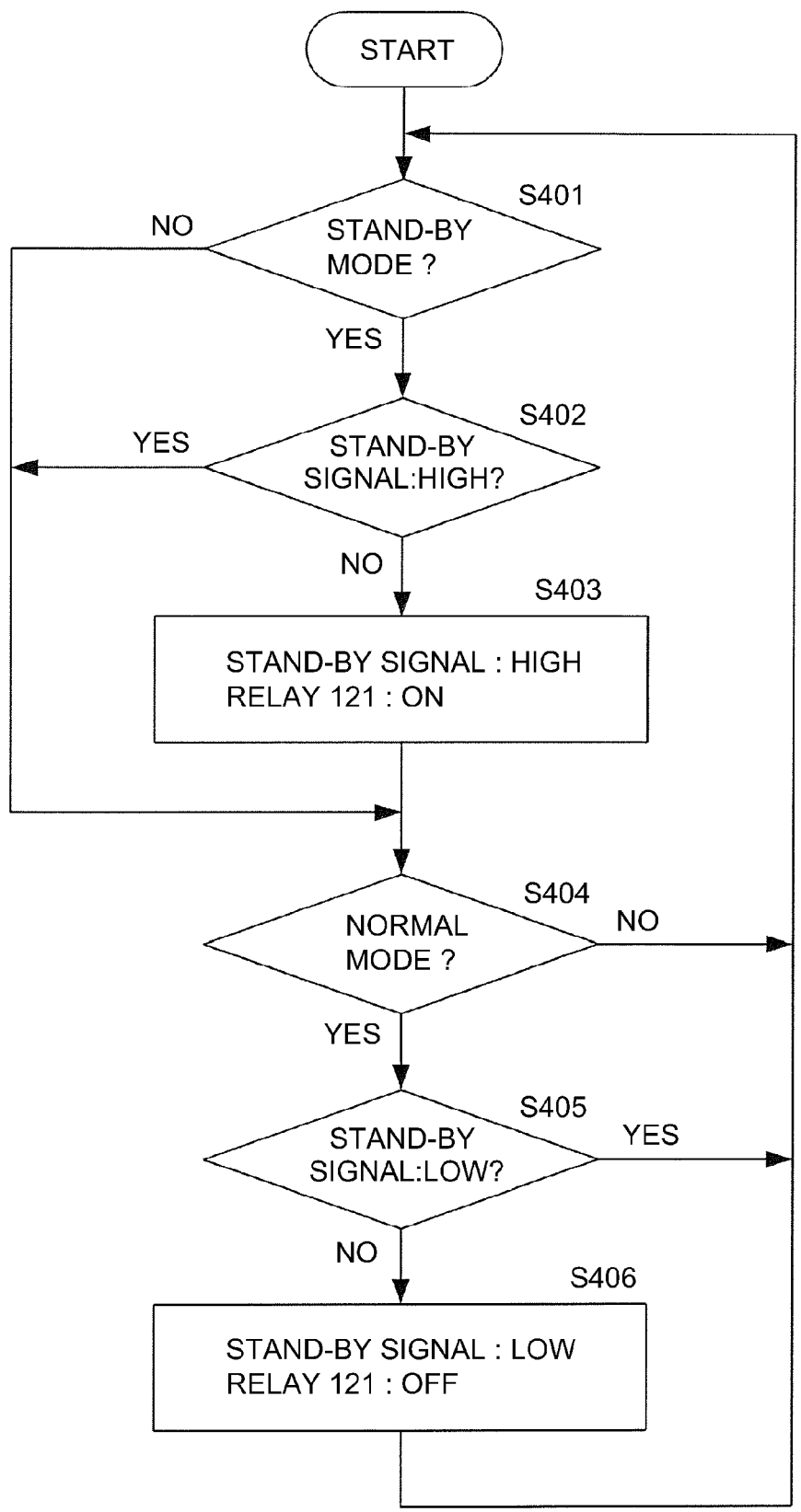
FIG. 6 is a flowchart of primary winding switching control in Embodiment 3.

FIG. 6 is a flowchart showing a control sequence of the relay 121 for controlling connection and disconnection of the primary winding 111a in FIG. 5, and the relay 121 is actuated when the electronic device 130 is turned on. The control sequence is carried out by the CPU 124. In S(step) 401, the CPU 124 discriminates whether or not the operating mode is the stand-by mode in which the load 125 is the light load. In the case where the CPU 124 discriminates that the load 125 is in the stand-by mode, the CPU 124 cause the process to go to S402, and in the case where the CPU 124 discriminates that the load 125 is not in the stand-by mode (i.e., in the normal mode), the CPU 124 causes the process to go to S404. In S402, the CPU 124 discriminates whether or not the level of the outputted stand-by signal is the high (Hi) level. In the case where the CPU 124 discriminates that the level of the outputted stand-by signal is the high level, the CPU 124 causes the process to go to S404, and in the case where the CPU 124 discriminates that the level of the outputted stand-by signal is not the high level (i.e., is the low level), the CPU 124 causes the process to go to S403. In S403, the CPU 124 sets the stand-by signal at the high level (Hi state). As a result, as described above, the relay 121 is turned on, so that the current flows through the primary windings 111a, 111b correspondingly to the light load state of the secondary-side load. In S404, the CPU 124 discriminates whether or not the operating mode is the normal mode in which the load 125 is the heavy load. In the case where the CPU 124 discriminates that the load 125 is in the normal mode, the CPU 124 cause the process to go to S405, and in the case where the CPU 124 discriminates that the load 125 is not in the normal mode (i.e., in the stand-by mode), the CPU 124 returns the process to S401. In S405, the CPU 124 discriminates whether or not the level of the outputted stand-by signal is the low (Low) level. In the case where the CPU 124 discriminates that the level of the outputted stand-by signal is the low level, the CPU 124 returns the process to S401, and in the case where the CPU 124 discriminates that the level of the outputted stand-by signal is not the low level (i.e., is the high level), the CPU 124 causes the process to go to S406. In S406, the CPU 124 sets the stand-by signal at the low level and returns the process to S401. As a result, as described above, the relay 121 is turned off, so that the current flows through only the primary winding, 111b correspondingly to the heavy load state of the secondary-side load.

As described above, the power source device 129 in this embodiment carries out, depending on the load state of the electronic device 130, connection and disconnection of the primary winding 111a by the stand-by signal indicating the load state outputted from the CPU 124. As a result, the primary inductance and the leakage inductance of the transformer 111 are switched, so that the efficiency during the light load can be improved. In this embodiment, the circuit for effecting the control of the switch 119 in (b) of FIG. 4 in the above-described Embodiment 2 was described, but a similar circuit is also applicable to the switch 120 in (c) of FIG. 4. Further, as regards the switches 117, 118 in (a) of FIG. 4, the above-described circuit for controlling the relay is provided to each of the switches 117, 118. Then, in the case where the stand-by signal is at the high level, the relay of the switch 117 is turned on, and in the case where the stand-by signal is at the low level, the relay of the switch 118 is turned on, so that it is possible to effect the control similar to the control of the cases of (b) and (c) of FIG. 4.

As described above, according to this embodiment, it is possible to improve the efficiency during the light load.

Embodiment 4

In Embodiment 3, an example in which the primary inductance and the leakage inductance of the transformer 111 is switched on the basis of the signal depending on the load state from the CPU 124 by controlling the connection of the primary winding 111a with the relay 121 was described. In Embodiment 4, an embodiment in which connection control of the primary winding 111a with the relay 121 is effected on the basis of the secondary-side load current of the transformer 111 will be described.

[Switching Circuit]

Figure 7:
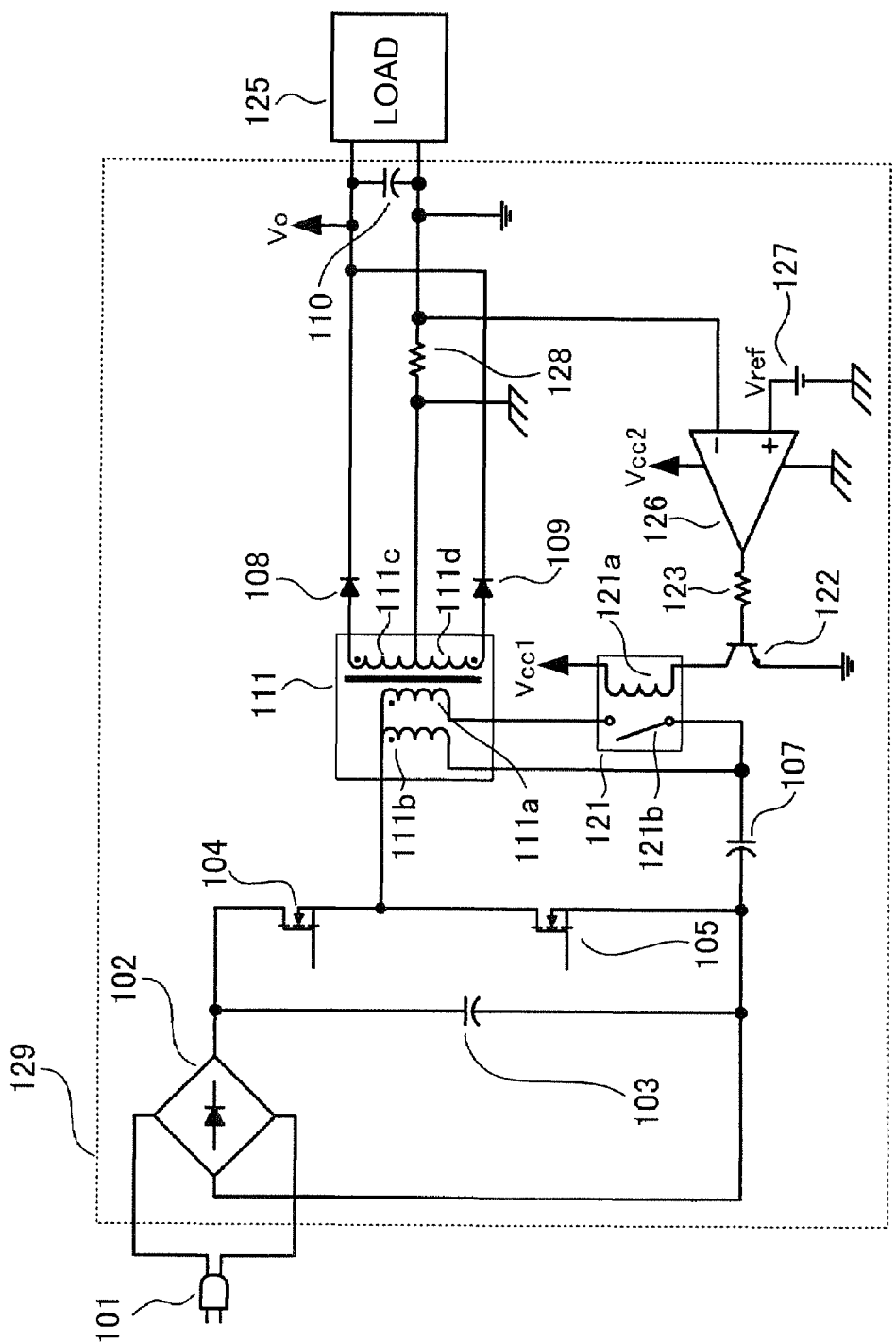
FIG. 7 is a circuit diagram of a power source device in Embodiment 4.

FIG. 7 is a circuit diagram showing a circuit constitution of a power source device 129 in this embodiment. Compared with the circuit constitution of the power source device 129 shown in FIG. 5 in Embodiment 3, a signal line of the stand-by signal outputted from the CPU 124 is deleted, and a detecting portion for detecting the secondary-side load current of the transformer 111 to control the relay 121 is added. Incidentally, in FIG. 7, the constituent elements of the circuit similar to those of the circuit shown in FIG. 5 of Embodiment 3 are represented by the same numerals or symbols and will be omitted from description.

The detecting portion is constituted by a comparator 126, a reference voltage 127 and a resistor 128, and detects the secondary-side load current and then outputs a high-level or low-level signal to a base terminal of the transistor 122 depending on a detected current value which is a result of detection. The resistor 128 as a first detecting means is a current-detecting resistor for detecting the secondary-side load current, and a voltage generating in the resistor 128 depending on a load current value is inputted into an inverting terminal (−) of the comparator 126. Into a non-inverting terminal (+) of the comparator 126, the reference voltage 127 is inputted. A voltage Vref is a value of the voltage generating in the resistor 128 when the secondary-side load current is a predetermined current value (predetermined value). The comparator 126 compares the voltages inputted into the inverting terminal (−) and the non-inverting terminal (+) with each other, and outputs the low-level signal when the inputted voltage of the inverting terminal is a larger and outputs the high-level signal when the inputted voltage of the non-inverting terminal is larger. Incidentally, as the voltage Vcc1 of the relay 121 and a voltage Vcc2 of the comparator 126, the output voltage Vo may also be used. Further, the reference voltage 127 may also be a value obtained by dividing the output voltage 127 by the resistor, for example.

When the secondary-side load current is I and a resistance value of the resistor 128 is R, if the secondary-side load current is small in the light load state and the voltage Vref of the reference voltage is larger than a voltage R×J (Vref>R×I), the connect 126 outputs the high-level signal. As a result, the transistor 122 is in the on state, so that the relay 121 is turned on and thus the current flows through the primary windings 111a, 111b. On the other and, if the secondary-side load current I is large in the heavy load state and the voltage Vref of the reference voltage is smaller than the voltage R×J (Vref<R×I), the connect 126 outputs the high-level signal. As a result, the transistor 122 is in the off state, so that the relay 121 is turned off and thus the current flows through only the primary winding 111b but does not flow through the primary winding 111a.

In this embodiment, control of the relay 121 is effected using the secondary-side load current, but the control is not limited thereto. For example, the control of the relay 121 is effected using a primary-side current, so that the primary winding may also be switched. Further, the control of the relay circuit is effected on the basis of the ON/OFF state of the transistor 122 depending on the output of the comparator 126, and therefore, similarly as in the above-described Embodiment 3, the relay circuit is similarly applicable to also the circuits shown in (a) and (c) of FIG. 4 in Embodiment 2.

As described above, according to this embodiment, it is possible to improve the efficiency during the light load.

Embodiment 5

In Embodiments 1 to 4, an example in which the primary inductance and the leakage inductance of the transformer are switched by controlling the connection of the primary winding with the relay was described. In Embodiment 5, an embodiment in which the primary winding connection is switched by FET will be described.

[Switching Circuit]

Figure 8:
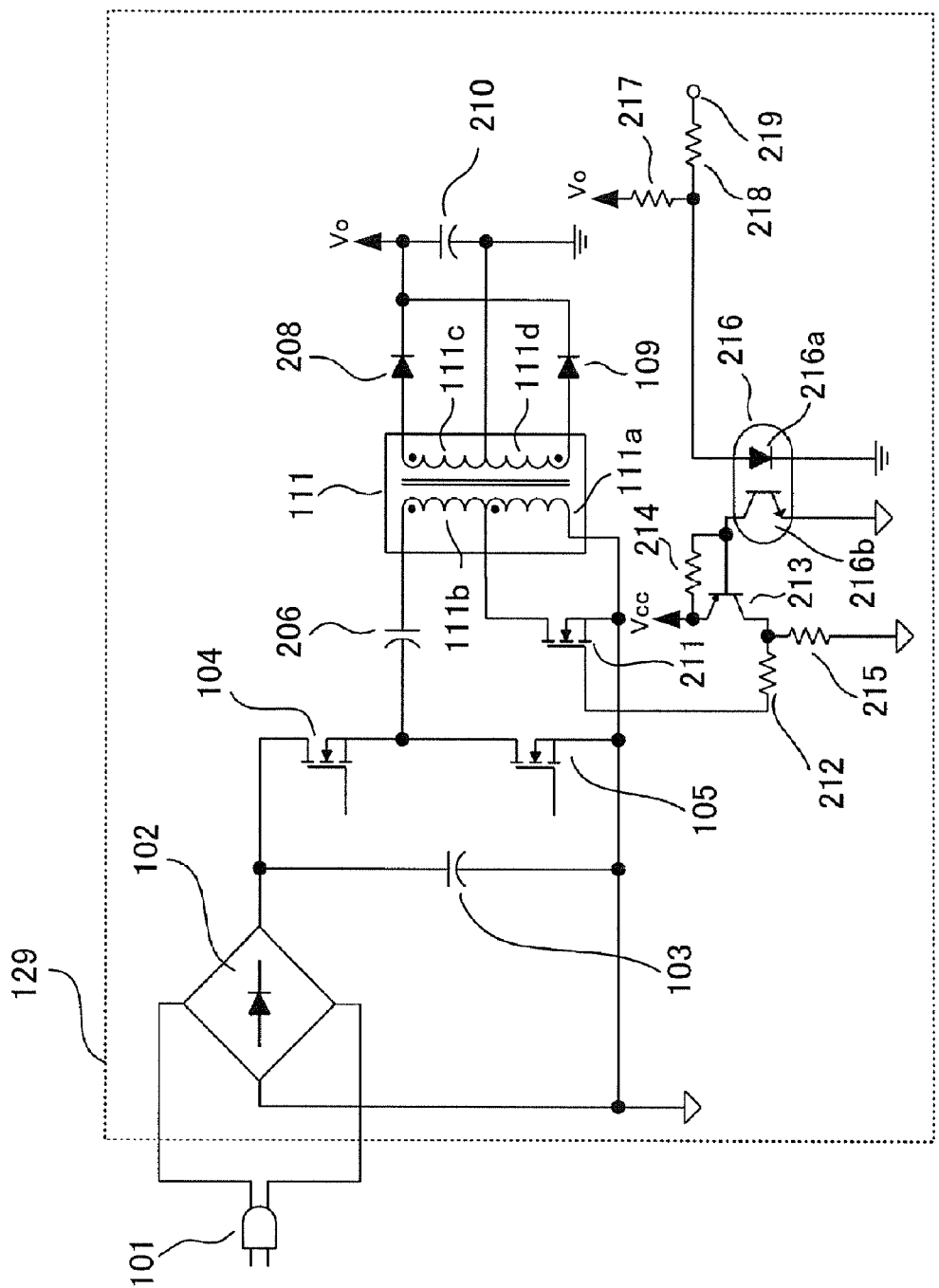
FIG. 8 is a circuit diagram of a power source device in Embodiment 5.

A circuit constitution of a power source device 129 in this embodiment shown in FIG. 8 will be described. A circuit diagram of the power source device 129 shown in FIG. 8 is a circuit diagram in which a circuit for controlling the switch 120 is added to the circuit diagram of (c) of FIG. 4 in the above-described Embodiment 2. In (c) of FIG. 4, the switch 120 as the switch means was the relay, but in this embodiment, FET 211 is used as the switch means, and as the control means, a transistor 213, a photo-coupler 216, and resistors 212, 214, 215, 217, 218 are added. Incidentally, as regards other elements of the circuit, the elements are circuit components similar to those in the above-described Embodiments 1 to 4 and will be omitted from description in this embodiment. The resonance capacitor 206 not only accumulates (charges) the electric charges under application of the voltage but also causes the current to flow through the primary windings 111a, 111b of the transformer 111 similarly as in the above-described Embodiments 1 to 4. Incidentally, the resonance capacitor 206 is different in position on the circuit from the resonance capacitors 107 in the above-described Embodiments 1 to 4, but is identical in operation as the resonance capacitor to the resonance capacitors in Embodiments 1 to 4. Further, in FIG. 8, an end of winding of the primary winding 111b and a start of winding of the primary winding 111a are drawn as a common line. As regards the constitution of the transformer 111 in this embodiment, a constitution in which a predetermined pin is used as a common pin and ties up the primary windings may be employed or a constitution in which pins are prepared as separate pins, not the common pin and the primary windings are connected in a pattern of a printed board may also be employed.

In FIG. 8, the FET 211 is FET for short-circuiting between terminals of the primary winding 111a. That is, when the FET 211 is turned on, the primary-side current is caused to flow through only the primary winding 111b but is not caused to flow through the primary winding 111a, and therefore the FET 211 functions so that a drain terminal and a source terminal of the FET 211 are in a short-circuit state therebetween. For that reason, in a state other than the state in which the secondary-side load is the light load, i.e., in the case of the above-described normal mode, the FET is turned on and operates so that the current flowing through the primary winding 111b flows through the FET 211. The resistor 212 is a resistor for limiting a gate current of the FET 211, the transistor 213 is a switching transistor for supplying voltage Vcc to the resistor 212, and the resistor 214 is a resistor between a base and an emitter of the transistor 213. The resistor 215 is a pull-down resistor for setting a gate terminal voltage of the FET 211 at a low level when the transistor 213 is turned off. The photo-coupler 215 is used for transmitting a secondary-side signal to the primary side and is constituted by a light-emitting diode 216a and a photo-transistor 216b. The resistor 217 is a resistor for pulling up an anode terminal of the light-emitting diode 216a by the voltage Vo, and the resistor 218 is a resistor for limiting a current. A signal input terminal 219 is connected with the above-described CPU 124 for controlling the electronic device 130 shown in FIG. 5, and in the normal mode, a high-level signal is inputted from the CPU 124 into the signal input terminal 219. On the other hand, when the mode of the electronic device3 130 changes into the stand-by mode which is the light load state, the CPU 124 outputs the low-level signal to the signal input terminal 219. Thus, a constitution in which ON/OFF of the FET 211 is controlled depending on a state of the input (signal) level of the signal input terminal 219, i.e., whether or not the electronic device is in the light load state is employed.

(Circuit Operation During Normal Mode)

In the power source device 129 having the circuit constitution shown in FIG. 8, in the case of the normal mode in which the operating state of the electronic device 130 is in the heavy load state, the input signal level of the signal input terminal 219 is the high level. In this case, the current flows from the voltage Vo to the light-emitting diode 216a of the photo-coupler 216 via the resistor 217. When the current flows, the light-emitting diode 216a of the photo-coupler 216 emits light, and the photo-transistor 216b which has received the light emitted from the light-emitting diode 216a is in the on state. As a result, from the voltage Vcc as a power source voltage for driving the FET 211, via the resistor 214, the current flows into the base terminal of the transistor 213. Then, when the voltage generating between the terminals of the resistor 214 is not less than the voltage between the base and the emitter of the transistor 213, the transistor 213 is in the on state, so that the voltage Vcc is applied to the resistor 212. Then, the current flows via the resistor 212 to which the voltage Vcc is applied, and the voltage is applied to the gate terminal of the FET 211, so that the FET 211 is turned on. As a result, a short-circuit state is formed between the drain and the source of the FET 211, i.e., the short-circuit state is formed between the terminals of the primary winding 111a. At this time, a circuit connection state of the primary winding of the transformer 111 is such that of the primary windings 111a, 111b, the primary winding 111a does not exist in the circuit and thus is a state in which the current flows through only the primary winding 111b. Setting of circuit constants is carried out so that necessary maximum electric power can be supplied to the secondary-side load in a state in which the primary winding of the transformer 111 is constituted only by the primary winding 111b.

As a design method of the power source device of the general current resonance type, a gain capable of satisfying an all range of the input voltage is calculated. Then, the turn ratio, the primary inductance and the leakage inductance of the transformer, and the capacity of the resonance capacitor, the frequency, and the like are set so that the maximum electric power can be supplied. Here, a ratio between the primary inductance and the leakage inductance can increase the gain with a decreasing value thereof. The gain can be increased with a decreasing value of the leakage inductance and with an increasing value of the capacity of the resonance capacitor. Further, the excitation inductance largely relating to the excitation current is calculated as a difference between the primary inductance and the leakage inductance, and the excitation current and the excitation inductance roughly provide a relationship represented by the following formula (4).

$$I_m = \frac{\sqrt{2} \cdot n \cdot V_O}{\pi^2 \cdot f \cdot L_m} \quad (4)$$

In the formula (4), Im is the excitation current, n is the turn ratio, Vo is the output voltage, f is a switching frequency, and Lm is the excitation inductance.

From the formula (4), it is understood that the excitation inductance is set at a large value in order to reduce the excitation current. When the primary inductance and the leakage inductance of the transformer 111 with respect to the necessary electric power is acquired by a known method, as described above, the excitation inductance can be simply acquired as the difference between the primary inductance and the leakage inductance. At this time, the calculated excitation inductance is an optimum excitation inductance for outputting the maximum electric power. However, on the other hand, at the calculated excitation inductance, in the light load state, an excessive electric power state in which the excitation current excessively flows is formed, so that the excessive electric power state causes a lowering in efficiency.

As shown in the above-described formula (4), the excitation current Im is inversely proportional to the excitation inductance Lm, and therefore when the excitation inductance Lm is made large, the excitation current Im becomes small. For this reason, in order to improve the efficiency in the light load state, there is a need to employ a circuit constitution such that a small excitation inductance during the heavy load changes to a large excitation inductance during the light load. As a result, the excitation current can be decreased.

(Circuit Operation During Stand-by Mode)

In the power source device 129 having the circuit constitution shown in FIG. 8, in the case of the stand-by mode in which the operating state of the electronic device 130 is in the light load state, the input signal level of the signal input terminal 219 is the low level. In this case, the current does not flow through the light-emitting diode 216a of the photo-coupler 216 via. As a result, also the photo-transistor 216b is in the off state, and therefore also the transistor 213 is in the off state. Therefore, the voltage Vcc is not applied to the gate terminal of the FET 211, so that the FET is in the off state. Accordingly, the primary windings of the transformer 111 are in a state in which the primary winding 111a and the primary winding 111b are series-connected with each other, so that compared with the case where the input signal of the signal input terminal 219 is at the high level, the state of the primary winding of the transformer 111 changes to a state in which the number of windings (turns) of the primary windings increases.

The primary inductance of the transformer 111 is calculated by multiplying AL value which is a characteristic value of the transformer 111 by a square value of the number of turns of the primary winding, and therefore the constitution of the primary winding changes depending on a change in state of the input signal from the signal input terminal 219. That is, depending on whether the primary winding is only the primary winding 111b or is in a state in which the primary windings 111a, 111b are series-connected with each other, the number of turns of the primary winding largely changes, so that also the primary inductance largely changes. On the other hand, the leakage inductance is almost determined by the structure of the transformer 111 and little changes even when the number of turns of the primary winding changes, so that this change amount is a negligible amount when compared with a change amount of the primary inductance. Accordingly, the change amount of the excitation inductance can be considered as the change amount itself of the primary inductance. By the above-described formula (4), it is understood that the excitation current is proportional to the number of turns of the primary winding and is inversely proportional to the excitation inductance. When the number of turns of the primary winding increases and the turn ratio, i.e., the ratio of (number of turns of primary winding)/(number of turns of secondary winding) increases, also the excitation current increases, but the excitation inductance works with the square of the number of turns, and therefore when the number of turns of the primary winding is increased, the excitation current lowers consequently.

On the other hand, the load current and the turn ratio provide a relationship represented by the following formula (5).

$$I_{OP} = \frac{\pi \cdot I_O}{2\sqrt{2} \cdot n} \quad (5)$$

In the formula (5), Iop is a current obtained by a converting the load current into the primary-side current, Io is the load current, and n is the turn ratio. From the formula (5), when the turn ratio n is increased by increasing the number of turns of the primary winding, the primary-side-converted load current Iop lowers, so that the primary-side current which is the sum of the load current and the excitation current further lowers. However, originally, in the light load state, the load current little flows, and therefore this current Iop itself is a very small current when compared with the excitation current. That is, the primary-side current in the light load state is almost dominated by the excitation current.

As an example of measurement of the primary-side current, an experiment was conducted under the following two conditions 1 and 2.

<Condition 1>

In this condition, the primary inductance if 65 μH, the leakage inductance is 30 μH, the number of turns of the primary winding is 28 turns, the number of turns of the secondary winding is 6 turns, and the load current is 0.01 A. As a simulation result in this condition, a current value of the primary-side current was 7.9 A.

<Condition 2>

In this condition, the primary inductance is 102 μH, the leakage inductance is 30 μH, the number of turns of the primary winding is 35 turns, the number of turns of the secondary winding is 6 turns, and the load current is 0.01 A. In the condition 2, compared with the condition 1, the number of transformers of the primary winding was increased by 7 turns (=35 turns−28 turns), with the result that the primary-side inductance was increased by 37 μH (=102 pH−65 μH). as a simulation result in this condition, the primary-side current value was 6.2 A, so that a current-reducing effect of about 22% (=((7.9 A−6.2 A)/(7.9 A)×100 (%)) was achieved.

By the above-described characteristic change, a drive frequency (supplying frequency) lowered from 47 kHz to 37 kHz. When notification is focused on only the drive frequency, by the above-described formula (4), there is a relationship such that the excitation current Im increases when the drive frequency lowers. As described above, the primary inductance is the sum of the leakage inductance and the excitation inductance. Further, the primary inductance is calculated by multiplying the AL value which is the characteristic value of the transformer 111 by the square of the number of turns of the primary winding, and the leakage inductance is substantially determined by the structure of the transformer. Accordingly, it would be considered that the primary inductance is proportional to the square of the number of turns of the primary winding and the leakage inductance is a fixed value, and therefore the excitation inductance largely changes in connection with a value of the square of the number of turns of the primary winding. The excitation current can be calculated by the above-described formula (4), but in the formula (4), the term relating to the primary winding is the turn ratio n and the excitation inductance Lm. When the number of turns of the primary winding increases, also the turn ratio becomes large, but the excitation inductance increases by the square of the number of turns of the primary winding, and therefore as an overall effect, the excitation current lowers consequently.

Figure 9:
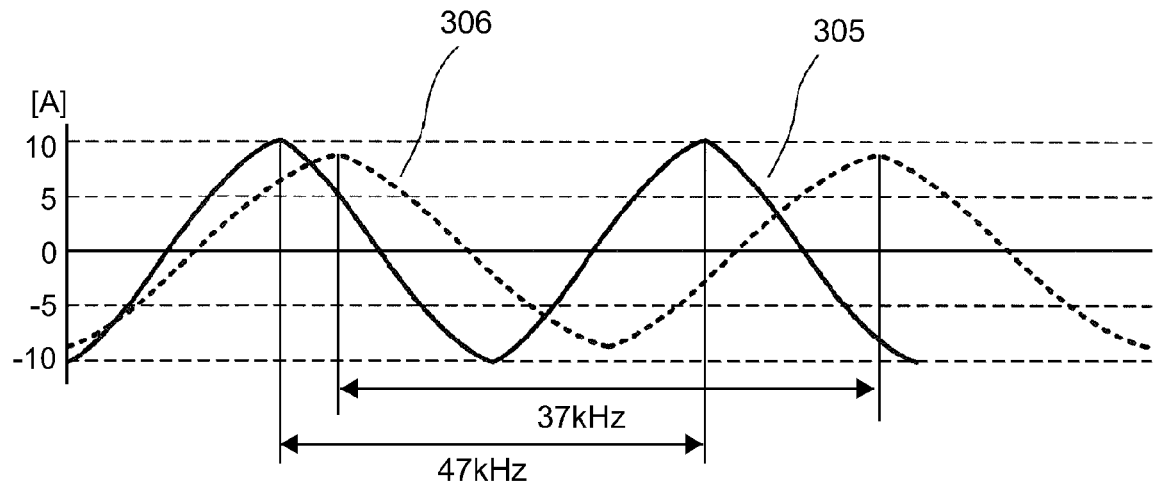
In FIG. 9, (a) is a diagram showing current waveforms of the power source device in Embodiment 5, and (b) is a diagram showing an inside constitution of a transformer in Embodiment 5.
Figure 9:
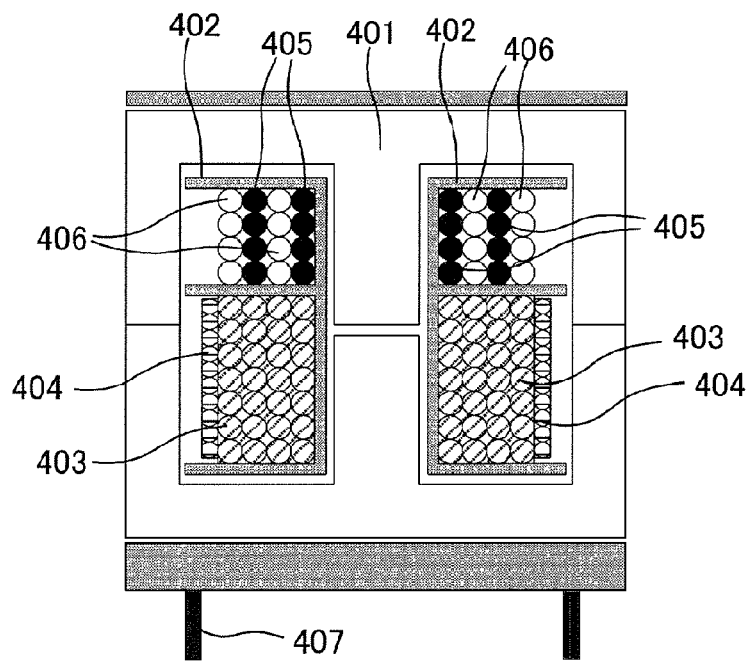

A result of comparison of the current waveforms in the above-described experiment is (a) of FIG. 9. In FIG. 9, (a) is a graph showing the current waveforms under the conditions 1 and 2 in the above-described experiment, in which the abscissa represents a time, and the ordinate represents a current value (unit: A). In the figure, a waveform 305 is the current waveform in the case of the condition 1 in a state in which the primary winding of the transformer 111 consists only the primary winding 111b (i.e., in a state in which the FET 211 is turned on). On the other hand, a waveform 306 is the current waveform in the case of the condition 2 in a state in which the primary winding of the transformer 111 is in a state in which the primary windings 111a, 111b are series-connected with each other (i.e., in a state in which the FET 211 is turned off). Each of the current waveforms shown in (a) of FIG. 9 is the current waveform during the light load, and therefore there is substantially no load current component and thus the current is constituted only by an excitation current component.

When the two current waveforms are compared with each other, it is understood that compared with the current waveform of the waveform 3305, the current waveform of the waveform 306 decreases in maximum current value and minimum current value and a switching period is long, i.e., the drive frequency is low. As a result, an effective current value of the waveform 306 is reduced by about 22% compared with the waveform 305. Incidentally, in FIG. 8, the circuit constitution in which the current is caused to flow in the normal mode during the heavy load by turning on the photo-coupler 216 and the transistor 213 and on the other hand, the current is not caused to flow in the stand-by mode during the light load by turning off the photo-coupler 216 and the transistor 213 is shown. As a result, the circuit constitution in which current consumption in the stand-by mode which is the light load state can be suppressed is provided.

[Inside Constitution of Transformer]

In FIG. 9, (b) is a sectional view showing a cross-section of a division-type transformer 111 used in the power source device 129 of the current resonance type. In (b) of FIG. 9, a core 401 is a ferrite core which is a magnetic material, and a bobbin 402 is a bobbin, to which the core 401 is fixed, for forming a winding region of the primary winding and the secondary winding. The transformer 111 in this embodiment is a vertical(-type) transformer in which E-shaped cores 401 are inserted into the bobbin 402 from above and below. The lower-side core 401 constitutes a spacing with a predetermined distance in order to enhance a DC superposition characteristic of the transformer 111, and in the spacing, the primary windings and the secondary windings are wound about the bobbin 402 in a line-symmetrical relationship with respect to a central portion of the core 401. In (b) of FIG. 9, primary winding 403, 404 correspond to the primary windings 111b, 111a, respectively, in FIG. 8, and secondary windings 405, 306 correspond to the secondary windings 111c, 111d, respectively, in FIG. 8. The secondary windings 405, 406 are alternately wound superposedly so that a connection distance thereof with the primary winding 403 is minimized to the possible extent. Pins 407 are binding pins for electrically connecting the respective windings and for being solder-connected with a printed board (not shown).

Thus, as shown in (b) of FIG. 9, in the transformer 111, the primary winding 111a (404 in (b) of FIG. 9) is wound about the primary winding 111b (403 in (b) of FIG. 9). In the normal mode in the heavy load state, the current is caused to flow through only the primary winding 111b (403 in (b) of FIG. 9). On the other hand, in the stand-by mode in the light load state, the primary winding 111b (403 in (b) of FIG. 9) and the primary winding 111a (404 in 8b) of FIG. 9) are series-connected with each other and the current is caused to flow through these primary windings, so that the number of turns of the primary windings is increased. As a result, not only the primary inductance is increased but also the excitation inductance is increased, so that the excitation current is lowered, and thus the primary-side current can be lowered consequently.

As described above, a circuit constitution in which the primary windings are constituted by series-connecting the primary windings 111a with the primary winding 111b and the FET 211 is connected in parallel with the primary winding 111a is employed, so that in a state other than the light load state, the FET 21 is turned on and thus the primary winding 111a is short-circuited. By employing such a constitution, it becomes possible to reduce the primary-side current in the light load state. Incidentally, the primary winding 111a is the primary winding through which the current flows only during the light load. For that reason, compared with the wired diameter of the primary winding 111b for permitting the current during maximum electric power, the wire diameter of the primary winding 111a is made thin (small), so that it is possible to suppress an increase in size of the transformer 111. In this embodiment, the case where the low-level signal is outputted from the CPU 124 as the controller for the electronic device 130 to the signal input terminal 219 only during the light load was described. For example, in the case where the electric power consumption control is set for during the heavy load, during the medium load, and the during the light load, for example, the low-level signal is outputted during the medium load and during the light load, so that the switching of the primary winding may also be carried out. In this embodiment, as the switching means of the primary winding, the FET was used. Also in the above-described embodiments in which the relay circuit is used as the switch means, the FET can be used as the switch means by using the circuit for controlling the FET 211 in this embodiment. For example, as in (a) and (b) of FIG. 4 in Embodiment 2, in the case where the FET is usable in place of the relay circuit, the circuit for controlling the FET 211 in this embodiment is used, so that the FET can be used as the switch means.

As described above, according to this embodiment, the efficiency during the light load can be improved.

Embodiment 6

In Embodiment 5, the example in which the division-type transformer is used as the transformer 111 was described. In Embodiment 6, a lamination-type transformer is used as the transformer 111, so that the leakage inductance in the light load state is further decreased and thus the excitation inductance is increased, with the result that the primary-side current is further reduced.

[Inside Constitution of Transformer]

Figure 10:
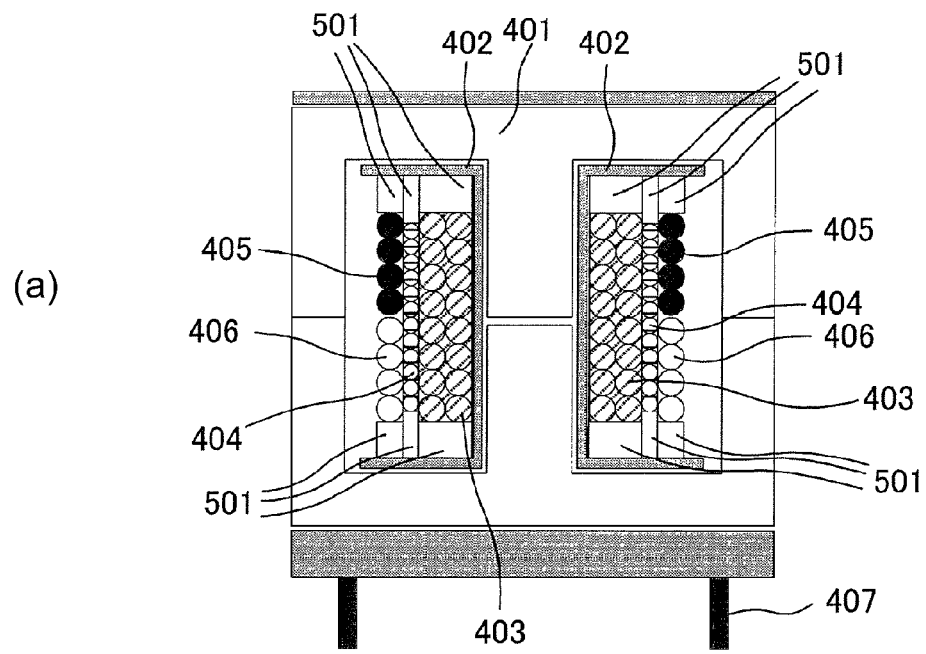
In FIG. 10, (a) is a diagram showing an inside constitution of a transformer in Embodiment 6, and (b) is a diagram showing a primary winding switching circuit in Embodiment 7.
Figure 10:
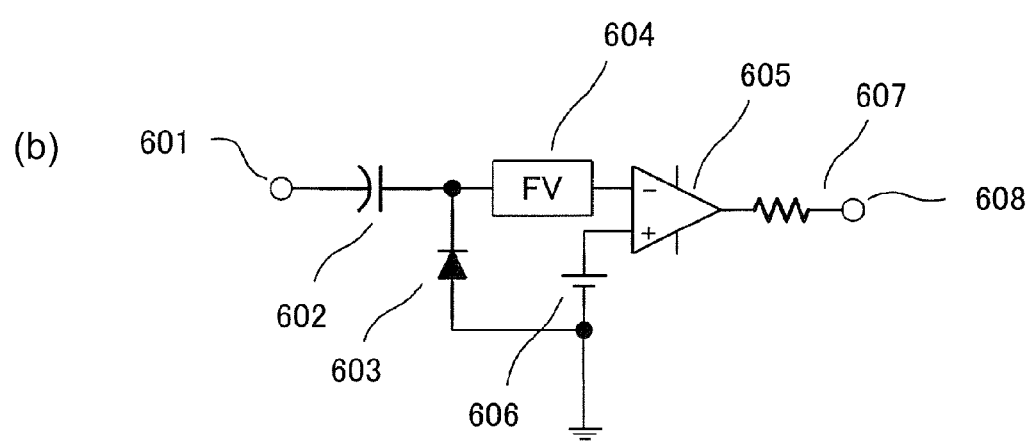

A sectional view showing an inside constitution of the transformer 111 in this embodiment is (a) of FIG. 10, in which constituent elements similar to those in the constitution of (b) of FIG. 9 in Embodiment 5 are represented by the same reference numerals or symbols. In (a) of FIG. 10, as an inner layer of the bobbin 402, the primary winding 403 (corresponding to the primary winding 111*b* in FIG. 8) is wound, and as a layer thereon, the primary winding 404 (corresponding to the primary winding 111*a* in FIG. 8) is wound. Further, as a layer on the primary winding 404, the secondary winding 405 (corresponding to the secondary winding 111*c* in FIG. 8) and the secondary winding 406 (corresponding to the secondary winding 111*c* in FIG. 8) and the secondary winding 406 (corresponding to the secondary winding 111*d* in FIG. 8) are wound in a vertical divided state as shown in (a) of FIG. 10. A barrier tape 501 is used for ensuring a creepage distance for insulation between the respective windings, and in the case where the number of turns of each of the windings is small, the barrier tape 501 is used also for the purpose of setting a winding position of the associated winding. Incidentally, the barrier tape 501 is indicated by a white block disposed between the bobbin 402 and an associated one of the primary windings 403, 404 and the secondary windings 405, 406.

As shown in (a) of FIG. 10, the transformer 111 has a winding constitution in which the primary winding 404 (the primary winding 111*a* in FIG. 8) through which the current flows only in the light load state is sandwiched between the primary winding 403 (the primary winding 111*b* in FIG. 8) and the secondary windings 405, 406. By employing such an inside constitution of the transformer 111, the FET 211 is in the on state, and in the case where the current does not flow through the primary winding 404 (the primary winding 111*a* in FIG. 8), the following state is formed. That is, the state in equivalent to a state a physical distance between the primary winding 403 (the primary winding 111*b* in FIG. 8) and the secondary windings 405, 406 are increased, and therefore a coupling constant becomes small. On the other hand, in the case where the FET 211 is in the off state and thus the current flows through also the primary winding 404 (the primary winding 111*a* in FIG. 8), the primary winding 403 (the primary winding 111*b* in FIG. 8) and the secondary windings 405, 406 are originally close to each other, and therefore, the coupling constant is still large. Due to the difference in state between the above-described two cases, the leakage inductance is smaller in the light load state than in the heavy load state. On the other hand, in the light load state, the primary winding 403 (the primary winding 111*b* in FIG. 8) and the primary winding 404 (the primary winding 111*a* in FIG. 8) are series-connected with each other, and therefore the number of turns of the primary winding increases, so that also the primary inductance increases. The excitation inductance is the difference between the primary inductance and the leakage inductance, and when the primary inductance increases and the leakage inductance decreases, the excitation inductance can be made further large. As a result, the primary-side current can be made further small.

As described above, the winding constitution in which the lamination-type transformer is used as the transformer for use with the power source device 129 of the current resonance type, and in which the primary winding 404 through which the current flows only during the light load is sandwiched between the primary winding 403 and the secondary windings 405, 406 is employed. Then, depending on the state of the secondary-side load, the leakage inductance is controlled by turning on and off the FET 211 to cause flow and non-flow of the current through the primary winding 404, so that the primary-side current in the light load state can be further reduced.

As described above, according to this embodiment, the efficiency during the light load can be improved.

Embodiment 7

In Embodiment 5, the embodiment in which the switching of the primary winding is made depending on the input signal from the CPU of the electronic device was described. In Embodiment 7, an embodiment of a power source device in which a drive frequency of the transformer is automatically detected and on the basis of the detected drive frequency, the switching of the primary winding is carried out will be described.

[Switching Circuit]

In a circuit of the power source device 129 in this embodiment, the circuit for controlling ON/OFF of the FET 211 is omitted from the circuit diagram shown in FIG. 8 in Embodiment 5 and a circuit shown in (b) of FIG. 10 is added between a gate terminal of the FET 105 and a gate terminal of the FET 211. That is, in the circuit diagram of FIG. 8, the transistor 213, the photo-coupler 216 and the resistors 212, 214, 215, 217, 218 which are the circuit elements between the gate terminal of the FET 211 and the signal input terminal 219 are deleted (removed). Then, in the resultant circuit diagram of FIG. 8 from which these circuit elements are removed, an input terminal 601 of the circuit shown in (b) of FIG. 10 is connected with the gate terminal of the FET 105 and an output terminal 608 of the circuit is connected with the gate terminal of the FET 211. The resultant circuit diagram is the circuit diagram of the power source device 129 in this embodiment. Incidentally, other circuit constituent elements are similar to those in FIG. 8, and will be omitted from description in this embodiment. In the following, the circuit portion added in this embodiment will be described.

In (b) of FIG. 10, the input terminal 601 is connected with the gate terminal of the FET 105, so that a pulse voltage is to be inputted (applied) from the input terminal 601 into the gate terminal of the FET 105. The inputted pulse voltage is inputted via a capacitor 602 into a frequency-voltage conversion circuit (FV condition) 604 which is a second detecting means. Incidentally, the pulse voltage inputted into the FV circuit 604 is clamped by a diode 603 with respect to a lower limit voltage. The FV circuit 604 outputs a voltage proportional to a frequency of the inputted pulse voltage, i.e., a low voltage when the input frequency of the pulse voltage is low and a high voltage when the input frequency of the pulse voltage is high. An output voltage of the FV circuit 604 is inputted into the inverting (input) terminal (−) of a comparator 605.

In the comparator 605, the output voltage of the FV circuit 604 inputted into the inverting terminal (−) and a reference voltage 606 inputted into the non-inverting (input) terminal (+) are compared with each other. Here, the reference voltage 606 sets an output voltage of the FV circuit 604 when the pulse voltage corresponding to the drive frequency (predetermined frequency) of the FET 105 in the stand-by mode in which the electronic device 130 is in the light load state. The comparator 605 outputs a low-level signal when the voltage inputted into the inverting terminal (−) is higher than the reference voltage 606 inputted into the non-inverting terminal (+). On the other hand, the comparator 605 outputs a high-level signal when the voltage inputted into the inverting terminal (−) is lower than the reference voltage 606 inputted into the non-inverting terminal (+). The signal outputted from the comparator 605 is outputted, via a limiting resistor 607 connected with the gate terminal of the FET 211, from the current terminal 608 connected with the gate terminal of the FET 211, and then is inputted into the gate terminal of the FET 211.

In the above-described circuit constitution, in the case where the operating state of the electronic device 130 is not in the light load state (i.e., in the normal mode), the drive frequency of the FET 105 is not more than a frequency corresponding to the reference voltage 606. For that reason, the voltage outputted from the FV circuit 604 is lower than the reference voltage 606, so that a signal voltage outputted from the comparator 605 is at a high level. Accordingly, the FET 211 is in the on state, and the primary winding 111a is short-circuited by the FET 211, so that a state in which only the primary winding 111b is connected is formed.

On the other hand, in the case where the operating state of the electronic device 130 is in the light load state (i.e., in the stand-by mode), the drive frequency of the FET 105 is higher than a frequency corresponding to the reference voltage 606. For that reason, the voltage outputted from the FV circuit 604 is higher than the reference voltage 606, so that a signal voltage outputted from the comparator 605 is at a low level. Accordingly, the FET 211 is in the off state, and the primary windings 111a, 111b are in a state in which these primary windings are series-connected with each other. As a result, the number of turns of the primary windings is increased, and thus the excitation current is decreased, so that the primary-side current can be reduced.

As described above, the drive frequency of the power source device is automatically detected and the FET 211 is automatically turned off at the time when the electronic device is in the light load state, so that switching is effected in such a manner that the primary winding 111a through which the current flows only during the light load is connected, with the result that the primary-side current can be reduced. Further, also in the above-described embodiments in which the relay circuit is used as the switch means, in the case where the FET is usable in place of the relay circuit, by using the above-described circuit in this embodiment, the switching of the primary winding can be carried out depending on the drive frequency of the power source device.

As described above, according to this embodiment, it is possible to improve the efficiency during the light load.

Embodiment 8

The power source devices described in Embodiments 1 to 7 are applicable to, e.g., a low-voltage source of the image forming apparatus as an example of the electronic device 130, i.e., a power source for supplying electric power to a driving portion such as a controller or a motor. In the following, a constitution of an image forming apparatus to which the power source devices of the above-described embodiments are applicable.

[Image Forming Apparatus]

Figure 11:
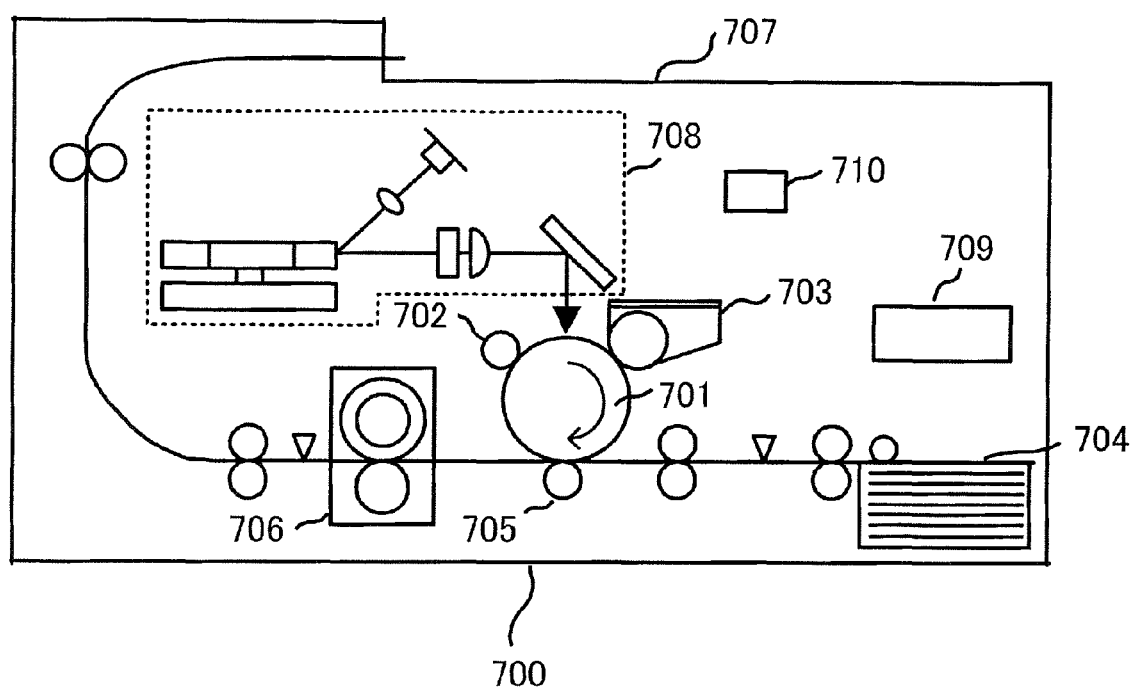
FIG. 11 is a schematic sectional view of a laser beam printer in Embodiment 8.

In FIG. 11 is a sectional view showing a schematic structure of a laser beam printer 700, which is the image forming apparatus, as an example of the electronic device 130 including the power source device 129 described in Embodiments 1 to 7. The laser beam printer 700 includes a photosensitive drum 701 as an image bearing member for forming an electrostatic latent image, a charging portion 702 for electrically charging the photosensitive drum 701 uniformly, and a laser scanner unit 708 for forming the electrostatic latent image on the photosensitive drum 701. The laser beam printer includes a developing portion 703 for developing, with a toner, the electrostatic latent image formed on the photosensitive drum 701. In the laser beam printer 700, the toner image formed on the photosensitive drum 701 is transferred by a transfer portion 705 onto a sheet (not shown) as a recording material supplied from a cassette 704, and then the toner image transferred on the sheet is fixed by a fixing device 706 and thereafter the sheet is discharged onto a tray 707. Incidentally, an image forming portion is constituted by the photosensitive drum 701, the charging portion 702, the laser scanner unit 708, the developing portion 703 and the transfer portion 705. Further, the laser beam printer 300 includes a power source device 709 which is a low-voltage source. The power source device 709 corresponds to the power source devices 129 in the above-described Embodiments 1 to 7. The image forming apparatus to which the power source devices 129 in Embodiments 1 to 7 are applicable is not limited to the image forming apparatus shown in FIG. 11, but may also be an image forming apparatus including a plurality of image forming portions, for example. The image forming apparatus may also be an image forming apparatus including a primary transfer portion where the toner image is transferred from the photosensitive drum 701 onto an intermediary transfer belt and a secondary transfer portion where the toner image is transferred from the intermediary transfer belt onto the sheet.

The laser beam printer 700 includes a controller 710 for controlling an image forming operation by the image forming portion and a sheet feeding operation, and the CPU 124 shown in FIG. 5 of Embodiment 3 corresponds to the controller 710. Further, also the CPU 214 inputting the signal into the signal input terminal 219 of FIG. 8 in Embodiment 5 corresponds to the controller 710. The controller 710 changes in state to the stand-by state (corresponding to the above-described normal mode) in which the printing operation can be carried out soon in a predetermined period when the printing operation by the image forming portion is ended. Further, the controller 710 changes in state to a sleep state (corresponding to the above-described stand-by mode) which is the stand-by state in order to minimize electric power consumption of the laser beam printer 700 after a lapse of the predetermined period. This sleep state is a state in which the load at a position other than a necessary position is blocked and thus is lightest.

The controller 710 controls the operation of the power source device 709 depending on the state of the laser beam printer, such as the print state, the stand-by state or the sleep state, so that electric power supply from the power source device 709 can be properly controlled.

As described above, according to this embodiment, it is possible to improve the efficiency during the light load.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-245100 filed on Dec. 16, 2015, which is hereby incorporated by reference herein in its entirety.

What is claimed is:
1. A power source device comprising:
a transformer in which a primary side and a secondary side are insulated from each other;
a first switching element and a second switching element which are connected in series;
a resonance capacitor connected in series with a primary winding of said transformer;

wherein one end of said second switching element is connected with one end portion of the primary winding different from another end portion of the primary winding connected with said resonance capacitor, wherein another end of said second switching element is connected with one end portion of said resonance capacitor different from another end portion of said resonance capacitor connected with the primary winding, and wherein said primary winding and said resonance capacitor are resonated with each other by alternately operating said first switching element and said second switching element to supply electric power to a load connected with a secondary winding of said transformer, a switch for connecting and disconnecting between the primary winding and said resonance capacitor, wherein the primary winding includes a first primary winding and a second primary winding, and wherein depending on the load, said switch connects or disconnects between the first primary winding and said resonance capacitor, or connects or disconnects between the second primary winding and said resonance capacitor.

2. The power source device according to claim 1, wherein said switch is connected with said resonance capacitor at one end thereof and is connectable with the first primary winding or the second primary winding at another end thereof, and wherein said switch is connected with the first primary winding when the load is a light load and is connected with the second primary winding when the load is a heavy load.

3. The power source device according to claim 2, wherein said switch is a relay element.

4. The power source device according to claim 2, wherein said switch is a bi-directional thyristor.

5. The power source device according to claim 2, wherein said transformer includes a bobbin for winding the first primary winding, the second primary winding and the secondary winding about said bobbin, wherein said bobbin includes a partitioning portion for dividing said bobbin into a region in which the first primary winding and the second primary winding are wound about said bobbin and a region in which the secondary winding is wound about said bobbin.

6. The power source device according to claim 5, wherein the first primary winding is wound about said bobbin at a position closer to the secondary winding than the second primary winding is.

7. The power source device according to claim 5, wherein a spacer is provided between the second primary winding and said partitioning portion for increasing a distance between the second primary winding and the second primary winding.

8. The power source device according to claim 2, wherein said transformer includes a bobbin for winding the first primary winding, the second primary winding and the secondary winding about said bobbin, wherein said bobbin does not include a partitioning portion for dividing said bobbin into a plurality of regions.

9. The power source device according to claim 8, wherein the first primary winding is wound about said bobbin so as to be sandwiched between the second primary winding and the secondary winding.

10. The power source device according to claim 8, wherein a spacer is provided between the first primary winding and the second primary winding and between the first primary winding and the secondary winding.

11. The power source device according to claim 2, wherein a wire diameter of the first primary winding and a wire diameter of the second primary winding are different from each other.

12. The power source device according to claim 1, wherein said switch includes a first switch which is connected with said resonance capacitor at one end thereof and which is connectable with the first primary winding at another end thereof and includes a second switch which is connected with said resonance capacitor at one end thereof and which is connectable with the second primary winding at another end thereof, and wherein said resonance capacitor and the first primary winding are connected with each other by turning on said first switch when the load is a light load, and said resonance capacitor and the second primary winding are connected with each other by turning on said second switch when the load is a heavy load.

13. The power source device according to claim 12, further comprising a controller for controlling said switch, wherein said controller turns on or off said switch depending on a signal for indicating a state of the load.

14. The power source device according to claim 12, further comprising:

a first detecting portion for detecting a load current flowing through the load; and a controller for controlling said switch on a basis of a detection result of said first detecting portion, wherein said controller turns off said switch when the load current is larger than a predetermined value and turns on said switch when the load current is smaller than the predetermined value.

15. The power source device according to claim 12, further comprising a controller for controlling said switch, wherein said switch is a FET, and wherein said controller turns on or off said FET on a basis of a side for indicating a state of the load.

16. The power source device according to claim 12, further comprising:

a second detecting portion for detecting a driving frequency of said second switch; and a controller for controlling said switch on a basis of a detection result of said second detecting portion, wherein said switch is a FET, and wherein said controller turns on said FET when the driving frequency is not more than a predetermined frequency and turns off said FET when the driving frequency is more than the predetermined frequency.

17. The power source device according to claim 1, wherein said switch includes a first switch which is connected with said resonance capacitor at one end thereof and which is connectable with the first primary winding at another end thereof and includes a second switch which is connected with said resonance capacitor at one end thereof and which is connectable with the second primary winding at another end thereof, and wherein said resonance capacitor and the second primary winding are connected with each other by turning on said second switch when the load is a heavy load, said resonance capacitor and the first primary winding are connected with each other by turning on said first switch when the load is a light load, and said resonance capacitor, the first primary winding and the second primary winding are connected with each other by turning on said first switch and said second switch to connect between the first primary winding and the second primary winding in parallel.

18. The power source device according to claim 1, wherein said switch is connected with said resonance capacitor at one end thereof and is connectable with the first primary winding at another end thereof,
   wherein the second primary winding is connected with said resonance capacitor,
   wherein said resonance capacitor and the first primary winding are connected with each other by turning on said switch so as to connect the first primary winding and the second primary winding in parallel when the load is a light load, and
   wherein said resonance capacitor and the first primary winding are not connected with each other by turning off said switch when the load is a heavy load.

19. The power source device according to claim 1, wherein the first and the second primary winding are connected with each other in series,
   wherein said switch is connected with the first primary winding in parallel,
   wherein said resonance capacitor, the first primary winding and the second primary winding are connected with each other by turning off said switch when the load is a light load, and
   wherein said resonance capacitor and the second primary winding are connected with each other by turning on said switch when the load is a heavy load.

20. An image forming apparatus comprising:
   an image forming portion for forming an image; and
   a power source device for supplying electric power to said image forming apparatus,
   wherein said power source device includes,
   a transformer in which a primary side and a secondary side are insulated from each other,
   a first switching element and a second switching element which are connected in series,
   a resonance capacitor connected in series with a primary winding of said transformer,
   wherein one end of said second switching element is connected with one end portion of the primary winding different from another end portion of the primary winding connected with said resonance capacitor,
   wherein another end of said second switching element is connected with one end portion of said resonance capacitor different from another end portion of said resonance capacitor connected with the primary winding, and
   wherein said primary winding and said resonance capacitor are resonated with each other by alternately operating said first switching element and said second switching element to supply electric power to a load connected with a secondary winding of said transformer,
   a switch for connecting and disconnecting between the primary winding and said resonance capacitor,
   wherein the primary winding includes a first primary winding and a second primary winding, and
   wherein depending on the load, said switch connects or disconnects between the first primary winding and said resonance capacitor, or connects or disconnects between the second primary winding and said resonance capacitor.

21. The image forming apparatus according to claim 20, further comprising a controller for controlling said image forming portion,
   wherein said controller currents a signal for notifying a state of the load to a controller for controlling said switch.

* * * * *